United States Patent
Kawamoto

(10) Patent No.: US 6,766,336 B2
(45) Date of Patent: Jul. 20, 2004

(54) GARBAGE COLLECTION APPARATUS AND A GARBAGE COLLECTION METHOD

(75) Inventor: Takuji Kawamoto, Nagoya (JP)

(73) Assignee: Matsushita Electric Industrial Co., Ltd, Osaka (JP)

(*) Notice: Subject to any disclaimer, the term of this patent is extended or adjusted under 35 U.S.C. 154(b) by 331 days.

(21) Appl. No.: 09/772,257

(22) Filed: Jan. 29, 2001

(65) Prior Publication Data

US 2001/0042074 A1 Nov. 15, 2001

(30) Foreign Application Priority Data

Jan. 28, 2000 (JP) ........................................ 2000-020844

(51) Int. Cl.[7] .............................................. G06F 17/30
(52) U.S. Cl. ........................................ 707/206; 707/205
(58) Field of Search ................................ 707/206, 205; 711/133

(56) References Cited

U.S. PATENT DOCUMENTS 4,775,932 A * 10/1988 Oxley et al. ................. 707/206
5,561,785 A * 10/1996 Blandy et al. ............... 711/170
6,249,793 B1 * 6/2001 Printezis et al. ............. 707/206

FOREIGN PATENT DOCUMENTS

| JP | 8106415 | 4/1996 |
| JP | 10111830 | 4/1998 |
| JP | 10320263 | 12/1998 |
| JP | 11120072 | 4/1999 |

* cited by examiner

Primary Examiner—John Breene
Assistant Examiner—Baoquoc N To

(57) ABSTRACT

A garbage collection apparatus that performs scavenging processing for specifying unused cell blocks from among a plurality of cell blocks, some of which can be reached from a specified root cell block via one of a set of trays. Each of the set of trays being specified by a second type address and holding a first type address, each of the plurality of cell blocks (a) being specified by a first type address and (b) including a plurality of cells that each hold one of a second type address and a numerical value, and compaction processing for relocating each of the specified unused cell blocks so as to form a continuous memory area, and updating each first type address that is held in a tray and corresponds to a cell block so as to specify a cell block following relocation.

19 Claims, 31 Drawing Sheets

FIG. 1

| VALID REFERENCE | CELL |
|---|---|
| 0 | CELL 0 |
| 1 | CELL 1 |
| 2 | CELL 2 |
| 3 | CELL 3 |
| 4 | CELL 4 |
| 5 | CELL 5 |
| 6 | CELL 6 |
| 7 | CELL 7 |
| 8 | CELL 8 |
| 9 | CELL 9 |
| 10 | CELL 10 |
| 11 | CELL 11 |
| 12 | CELL 12 |
| 13 | CELL 13 |
| 14 | CELL 14 |
| 15 | CELL 15 |
| 16 | CELL 16 |
| 17 | CELL 17 |
| . | . |
| 9999 | CELL 9999 |

| VALID HANDLE | TRAY |
|---|---|
| 0 | TRAY 0 |
| 1 | TRAY 1 |
| 2 | TRAY 2 |
| 3 | TRAY 3 |
| 4 | TRAY 4 |
| 5 | TRAY 5 |
| 6 | TRAY 6 |
| 7 | TRAY 7 |
| 8 | TRAY 8 |
| 9 | TRAY 9 |
| . | . |
| 2999 | TRAY 2999 |

FIG. 18

CONDITION OF CELLS IMMEDIATELY FOLLOWING END OF OPERATIONS I AND II

| VALID REFERENCE | | CELL | VALID HANDLE | TRAY |
|---|---|---|---|---|
| 1 | SYSTEM CELL ROOT CELL BLOCK | 5 | 1 | 5 |
| 2 | | 1 | 2 | 11 |
| 3 | | 0 | 3 | 33 |
| 4 | | 1 | 4 | 0 |
| 5 | SYSTEM CELL BLOCK | 11 | | |
| 6 | | 3 | | |
| 7 | | 0 | | |
| 8 | | 2 | | |
| 9 | | 3 | | |
| 10 | | 0 | | |
| 11 | CANDIDATE CELL BLOCK FOR TERMINAL A | 33 | | |
| 12 | | 19 | | |
| 13 | | 0 | | |
| 14 | | 9 | | |
| 15 | | SEAT NOS. (CANDIDATE 1) | | |
| ⋮ | | | | |
| 23 | | | | |
| 24 | | SEAT NOS. (CANDIDATE 2) | | |
| ⋮ | | | | |
| 32 | | | | |
| 33 | CANDIDATE CELL BLOCK FOR TERMINAL B | 45 | | |
| 34 | | 9 | | |
| 35 | | 0 | | |
| 36 | | 4 | | |
| 37 | | SEAT NOS. (CANDIDATE 1) | | |
| ⋮ | | | | |
| 40 | | | | |
| 41 | | SEAT NOS. (CANDIDATE 2) | | |
| ⋮ | | | | |
| 44 | | | | |
| 45 | | 0 | | |
| ⋮ | | ⋮ | | |
| 50 | | 0 | | |

FIG. 19
CONDITION OF CELLS FOLLOWING OPERATION III AND IMMEDIATELY PRIOR TO PROCESSING OF S34 IN SCAVENGING PERFORMED DURING OPERATION IV

| VALID REFERENCE | | CELL | VALID HANDLE | TRAY |
|---|---|---|---|---|
| 1 | SYSTEM CELL ROOT CELL BLOCK | 5 | 1 | 5 |
| 2 | | 1 | 2 | 11 |
| 3 | | 0 | 3 | 33 |
| 4 | | 1 | 4 | 0 |
| 5 | SYSTEM CELL BLOCK | 11 | | |
| 6 | | 3 | | |
| 7 | | 0 | | |
| 8 | | 0 | | |
| 9 | | 3 | | |
| 10 | | 0 | | |
| 11 | CANDIDATE CELL BLOCK FOR TERMINAL A | 33 | | |
| 12 | | 19 | | |
| 13 | | 0 | | |
| 14 | | 9 | | |
| 15 | | SEAT NOS. (CANDIDATE 1) | | |
| ⋮ | | | | |
| 23 | | | | |
| 24 | | SEAT NOS. (CANDIDATE 2) | | |
| ⋮ | | | | |
| 32 | | | | |
| 33 | | | | |
| 34 | CANDIDATE CELL BLOCK FOR TERMINAL B | 45 | | |
| 35 | | 9 | | |
| 36 | | 0 | | |
| 37 | | 4 | | |
| ⋮ | | SEAT NOS. (CANDIDATE 1) | | |
| 40 | | | | |
| 41 | | SEAT NOS. (CANDIDATE 2) | | |
| ⋮ | | | | |
| 44 | | | | |
| 45 | | 0 | | |
| ⋮ | | ⋮ | | |
| 50 | | 0 | | |

CELL BLOCK CONTENT

FIG. 20

CONDITION OF CELLS IMMEDIATELY PRIOR TO PROCESSING OF S45 IN SCAVENGING PERFORMED DURING OPERATION IV

| VALID REFERENCE | | CELL | VALID HANDLE | TRAY |
|---|---|---|---|---|
| 1 | ROOT CELL BLOCK | 5 | 1 | 5 |
| 2 | | 1 | 2 | 11 |
| 3 | | 1 | 3 | 33 |
| 4 | | 1 | 4 | 0 |
| 5 | SYSTEM CELL BLOCK | 11 | | |
| 6 | | 3 | | |
| 7 | | 1 | | |
| 8 | | 0 | | |
| 9 | | 3 | | |
| 10 | | 0 | | |
| 11 | CANDIDATE CELL BLOCK FOR TERMINAL A | 33 | | |
| 12 | | 19 | | |
| 13 | | 0 | | |
| 14 | | 9 | | |
| 15 | | SEAT NOS. (CANDIDATE 1) | | |
| ⋮ | | | | |
| 23 | | | | |
| 24 | | SEAT NOS. (CANDIDATE 2) | | |
| ⋮ | | | | |
| 32 | | | | |
| 33 | CANDIDATE CELL BLOCK FOR TERMINAL B | 45 | | |
| 34 | | 9 | | |
| 35 | | 1 | | |
| 36 | | 4 | | |
| 37 | | SEAT NOS. (CANDIDATE 1) | | |
| ⋮ | | | | |
| 40 | | | | |
| 41 | | SEAT NOS. (CANDIDATE 2) | | |
| ⋮ | | | | |
| 44 | | | | |
| 45 | | 0 | | |
| ⋮ | | ⋮ | | |
| 50 | | 0 | | |

FIG. 21

CONDITION OF CELLS IMMEDIATELY FOLLOWING END OF SCAVENGING PERFORMED DURING OPERATION IV

| VALID REFERENCE | | CELL | VALID HANDLE | TRAY |
|---|---|---|---|---|
| 1 | SYSTEM CELL ROOT CELL BLOCK | 5 | 1 | 5 |
| 2 | | 1 | 2 | 0 |
| 3 | | 1 | 3 | 33 |
| 4 | | 1 | 4 | 0 |
| 5 | | 11 | | |
| 6 | | 3 | | |
| 7 | | 1 | | |
| 8 | | 0 | | |
| 9 | | 3 | | |
| 10 | | 0 | | |
| 11 | ROOT CELL BLOCK | 33 | | |
| 12 | | 19 | | |
| 13 | | 0 | | |
| 14 | | 9 | | |
| 15 | | SEAT NOS. (CANDIDATE 1) | | |
| ⋮ | | | | |
| 23 | | | | |
| 24 | | SEAT NOS. (CANDIDATE 2) | | |
| ⋮ | | | | |
| 32 | | | | |
| 33 | CANDIDATE CELL BLOCK FOR TERMINAL B | 45 | | |
| 34 | | 9 | | |
| 35 | | 1 | | |
| 36 | | 4 | | |
| 37 | | SEAT NOS. (CANDIDATE 1) | | |
| ⋮ | | | | |
| 40 | | | | |
| 41 | | SEAT NOS. (CANDIDATE 2) | | |
| ⋮ | | | | |
| 44 | | | | |
| 45 | | 0 | | |
| ⋮ | | ⋮ | | |
| 50 | | 0 | | |

FIG. 22

CONDITION OF CELLS IMMEDIATELY PRIOR TO PROCESSING OF S61 IN COMPACTION PERFORMED DURING OPERATION IV

| VALID REFERENCE | | CELL | VALID HANDLE | TRAY |
|---|---|---|---|---|
| 1 | ROOT CELL BLOCK | 5 | 1 | 5 |
| 2 | | 1 | 2 | 0 |
| 3 | | 1 | 3 | 11 |
| 4 | | 1 | 4 | 0 |
| 5 | SYSTEM CELL BLOCK | 11 | | |
| 6 | | 3 | | |
| 7 | | 5 | | |
| 8 | | 0 | | |
| 9 | | 3 | | |
| 10 | | 0 | | |
| 11 | CANDIDATE CELL BLOCK FOR TERMINAL A | 33 | | |
| 12 | | 19 | | |
| 13 | | 0 | | |
| 14 | | 9 | | |
| 15 | | SEAT NOS. (CANDIDATE 1) | | |
| ⋮ | | | | |
| 23 | | | | |
| 24 | | SEAT NOS. (CANDIDATE 2) | | |
| ⋮ | | | | |
| 32 | | | | |
| 33 | CANDIDATE CELL BLOCK FOR TERMINAL B | 45 | | |
| 34 | | 9 | | |
| 35 | | 11 | | |
| 36 | | 4 | | |
| 37 | | SEAT NOS. (CANDIDATE 1) | | |
| ⋮ | | | | |
| 40 | | | | |
| 41 | | SEAT NOS. (CANDIDATE 2) | | |
| ⋮ | | | | |
| 44 | | | | |
| 45 | | 0 | | |
| ⋮ | | ⋮ | | |
| 50 | | 0 | | |

FIG. 23

CONDITION OF CELLS IMMEDIATELY FOLLOWING END OF COMPACTION PERFORMED DURING OPERATION IV

| VALID REFERENCE | | CELL | VALID HANDLE | TRAY |
|---|---|---|---|---|
| 1 | ROOT CELL BLOCK | 5 | 1 | 5 |
| 2 | | 1 | 2 | 0 |
| 3 | | 1 | 3 | 11 |
| 4 | | 1 | 4 | 0 |
| 5 | SYSTEM CELL BLOCK | 11 | | |
| 6 | | 3 | | |
| 7 | | 5 | | |
| 8 | | 0 | | |
| 9 | | 3 | | |
| 10 | | 0 | | |
| 11 | CANDIDATE CELL BLOCK FOR TERMINAL B | 23 | | |
| 12 | | 19 | | |
| 13 | | 11 | | |
| 14 | | 4 | | |
| 15 | | SEAT NOS. (CANDIDATE 1) | | |
| ⋮ | | | | |
| 18 | | | | |
| 19 | | SEAT NOS. (CANDIDATE 2) | | |
| ⋮ | | | | |
| 22 | | | | |
| 23 | | 0 | | |
| ⋮ | | ⋮ | | |
| 50 | | 0 | | |

FIG. 27

| VALID REFERENCE | CELL |
|---|---|
| 0 | CELL 0 |
| 1 | CELL 1 |
| 2 | CELL 2 |
| 3 | CELL 3 |
| 4 | CELL 4 |
| 5 | CELL 5 |
| 6 | CELL 6 |
| 7 | CELL 7 |
| 8 | CELL 8 |
| 9 | CELL 9 |
| 10 | CELL 10 |
| 11 | CELL 11 |
| 12 | CELL 12 |
| 13 | CELL 13 |
| 14 | CELL 14 |
| 15 | CELL 15 |
| 16 | CELL 16 |
| 17 | CELL 17 |
| ... | ... |
| 9999 | CELL 9999 |

GARBAGE COLLECTION APPARATUS AND A GARBAGE COLLECTION METHOD

BACKGROUND OF THE INVENTION

1. Field of the Invention

The present invention relates to a garbage collection apparatus for performing scavenging and compaction on cells using trays.

2. Description of the Prior Art

An application uses a heap for performing dynamic memory allocation. The heap referred to as unused cells. The application reserves a number of cells required for an application process as a cell block.

FIG. 28 shows an example of a heap. In the drawing, the heap includes a root cell block, cell blocks 1 to 5, and an unused cell area. The unused cell area is a collection of unused cells that have not been allocated.

When reserving memory the application forms reference relationships between cell blocks so that a reserved cell block can be referenced by other cell blocks. In FIG. 28 such references are shown by polygonal lines. A cell block 4 is referenced by a root cell block, a cell block 2 by the cell block 4, and a cell block 5 by the cell block 2. The root cell block is a cell block that is the start of the reference relationship.

To explain in more detail, the application holds a valid reference showing a start cell of the reserved cell block in a cell included in another cell block. A valid reference is a cell address or similar. To give one example shown in FIG. 28, the application holds a valid reference 3 showing a start cell in a cell block 2.

However, cell blocks that cannot be traced (reached) from the root cell block may be generated when the application is executing processing for a particular process. Such cell blocks are said to be unreachable (dead). Processing performed to free unreachable cell blocks and collect the freed cell blocks together to form an unused cell area in which cell blocks are once more capable of being used is known as garbage collection. A device for executing this processing is known as a garbage collector.

The garbage collector performs scavenging (relocating unreachable objects) and compaction (also known as compactifying). In FIG. 28, the garbage collector performs scavenging to return unreachable cell blocks 1 and 3 to an unused state, and then performs compaction to gather up the plurality of unused cell blocks into one unused cell area. When this processing is performed, the garbage collector updates valid references held by cells in order to maintain reference relationships between cell blocks.

Various refinements have been made to the algorithm used by the garbage collector. The following is an explanation of three garbage collectors in the prior art.

FIG. 29 shows a structure of a heap in a first prior art. In the drawing, the heap includes cells, and reference flags corresponding to each cell. The garbage collector performs scavenging as follows:

(1) sets 'in use' flags indicating whether cell blocks are in use or not at 0 (here, an 'in use' flag uses 1 bit from each cell block);

(2) reads a valid reference held in a root cell block;

(3) determines that a cell block at a location indicated by the read valid reference is in use, and sets the 'in use' flag for the cell block at 1;

(4) refers successively to each of the reference flags for the cell block determined to be in use, and retrieves all of the reference flags set at 1; and (5) reads valid references held in cells corresponding to each of the retrieved references. The garbage collector repeats the processing of (3) to (5) for all of the cell blocks that are reachable from the root cell block.

Following this, the garbage collector performs the following compaction:

(1) calculates a reference value for a start cell after compaction for all cell blocks with an 'in use' flag set at 1;

(2) rewrites reference values for all cells that have an 'in use' flag and a reference flag set at 1 with the reference values calculated in (1); and (3) shifts cell blocks with an 'in use' flag set at 1 to the reference locations calculated in (1).

FIG. 30 shows a heap memory for a second prior art example. As shown in the drawing, the heaps includes reference flags, cells, and trays. A cell block holds a valid handle indicating a tray, and the tray holds a valid reference indicating a start cell in a cell block. Reference relationships between cell blocks are indicated indirectly by using trays.

For example, a cell block 4 holds a valid handle 1, which indicates a tray with a valid handle 1. The tray with the valid handle 1 holds a valid reference 3, which indicates a cell block 2 in which the valid reference 3 is located. Thus, cell block 3 can reference cell block 2.

The garbage collector in the second prior art performs the following scavenging:

(1) specifies, via trays, cell blocks that are reachable from the root cell block, and sets the 'in use' flags for these cell blocks at 1 (this processing is similar to that in the first prior art);

(2) changes valid references for trays which are not referenced by any cell block to NULL references.

As one example of (2), the garbage collector updates the content of a tray with a valid handle 0 and a tray with a valid handle 2 that are not referenced by any cell block to a NULL reference. A NULL reference indicates that a tray is unused. Thus, cell blocks 1 and 3, whose valid references 1 and 6 were held by the trays with the valid handles 0 and 2 prior to updating, are freed by the garbage collector to form an unused cell area.

Following this, the garbage collector in the second prior art performs compaction as follows:

(1) calculates a reference value for a start cell after compaction for all cell blocks with an 'in use' flag set at 1;

(2) overwrites trays holding a valid reference with the reference values calculated in (1); and (3) shifts cell blocks with 'in use' flags set at 1 to a reference location calculated in (1).

In the example shown in FIG. 30, cell blocks 4 and 5 are shifted forward by an amount corresponding to the size of the freed cell blocks 1 and 3. Here, the garbage collector updates the content of the trays so as to maintain references from a root cell block to a cell block 4, and the cell block 4 to a cell block 2 and a cell block 5.

FIG. 31 shows a heap for a third prior art. The third prior art is one example of what is known as a conservative garbage collector. Such technology is disclosed in more detail in *Garbage Collection in an Uncooperative Environment* (Hans-Juergen Boehm and Mark Weiser, *Software Practice and Experience* Vol. 18, pub. September 1988, pages 807 to 820).

Here, the heap holds pointers (references) to cell blocks at a start of each cell block. The garbage collector in the third prior art performs the following scavenging:

(1) sets 'in use' flags indicating whether cell blocks are in use at 0;

(2) reads a valid reference held in the root cell block;

(3) determines whether a cell block at a location indicated by the read valid reference is in use;

(4) reads content at a start location of a cell block determined to be in use, and makes an assumption as to whether the read content is a reference value.

The garbage collector repeats the above processing (3) to (4) for all cell blocks that are reachable from the root cell block.

In FIG. 31, the polygonal lines show reference relationships between cell blocks.

The garbage collector in the third prior art makes assumptions as to whether cells contain numerical values or references, and performs garbage collection in accordance with the results of these assumptions. However, the garbage collector may mistakenly assume that a numerical value is a reference. For example, in FIG. 31, the garbage collector mistakenly assumes that a numerical value 6 is a valid reference. The curved line in the drawing shows the referencing that is performed based on this mistaken assumption. Since the garbage collector mistakenly assumes the numerical value 6 to be a valid handle 6, a mistaken reference from cell block 2 to cell block 3 is produced.

The garbage collector in the third prior art can perform scavenging, but not compaction. The reason for this is that if compaction is performed when such mistaken assumptions have been made, numerical values which have been mistakenly assumed to be handles will be updated.

As explained above, the garbage collectors in the first and second prior arts perform scavenging and compaction, and the garbage collector in the third prior art performs scavenging alone, to keep the heap in a state such that memory of a size required by the application can be reserved.

However, since the garbage collectors in the first and second prior arts use reference flags, reference flags are set while an application is being executed. Consequently, the processing load placed on the processor is increased, and the time required to execute the application is longer than that for an application that does not perform garbage collection.

Moreover, the garbage collector of the second prior art performs compaction at high speed, but, since handles are used, a larger amount of memory needs to be reserved than for the first prior art.

The garbage collector of the third prior art does not use reference flags when the application is executed, and so the processing load during execution of the application is lower than for the garbage collector of the first and second prior arts. However, the garbage collector of the third prior art does not perform compaction since numerical values may have been mistakenly assumed to be references. When compaction is not performed, the unused area is fragmented, and the number of small areas that cannot be recycled increases.

SUMMARY OF THE INVENTION

The present invention may be realized by a garbage collection apparatus that performs (1) scavenging processing for specifying unused cell blocks from among a plurality of cell blocks, some of which can be reached from a specified root cell block via one of a set of trays, tracing one or more cell blocks in a chain-like manner by referencing each of the one or more cell blocks, and others of which cannot be reached in this manner and are referred to as the unused cell blocks, each of the set of trays being specified by a second type address and holding a first type address, each of the plurality of cell blocks (a) being specified by a first type address and (b) including a plurality of cells that each hold one of a second type address and a numerical value, and (2) compaction processing for relocating each of the specified unused cell blocks so as to form a continuous memory area, and updating each first type address that is held in a tray and corresponds to a cell block so as to specify a cell block following relocation, the garbage collection apparatus comprising: assuming means for making an assumption as to whether a second type address is stored in a cell included in a first cell block, so as to avoid a situation in which the second type address is mistakenly assumed not to be a second type address; and specifying means for specifying an unused cell block using the scavenging processing by assuming that a second cell block is referenced by the first cell block, the second cell block being specified by a first type address, the first type address being held in a tray specified by data held in the cell that is assumed to be holding the second type address.

This enables the garbage collection apparatus to use trays to specify cells, and update first type addresses held in trays when performing compaction. Since the actual content of a cell is not updated, effective high-speed compaction can be achieved. Furthermore, the garbage collection apparatus does not use reference flags or similar to exchange information with an application when scavenging and compaction are performed. As a result, there is no need to reserve memory for reference flags, and an excessive processing load is not generated when executing an application that uses cells.

Furthermore, in the above garbage collection apparatus, a tray indicating an unused cell block newly specified by the scavenging processing may be recognized as an unused tray that does not hold a first type address.

In addition to the above effects, this construction enables the garbage collection apparatus to recycle trays which no longer need to be used, when a new request for use of cells is received.

Furthermore, in the above garbage collection apparatus, a value used for the second type address may be limited to within a specific range, the assuming means makes the assumption that data held by a cell is a second type address only when a tray, indicated when (1) the data is within the specific range and (2) the data is hypothetically assumed to be a type two address, is not an unused tray, and the garbage collection apparatus further comprises: detecting means for detecting that a value has been newly assigned to a cell; and prohibiting means for prohibiting, when the newly assigned value is assumed to be a second type address by the assuming means, use of a tray specified by the numerical value by hypothetically assuming that the value is a second type address.

In addition to the above effects, the garbage collection apparatus having this construction prohibits use of trays corresponding to numerical values which have been newly assigned to a cell, and judges whether a tray specified by the data assigned to a cell is an unused tray when an assumption is made. Consequently, cases in which a numerical value within the specified range for second type addresses is mistakenly assumed to be a second type address can be avoided.

Furthermore, the above garbage collection apparatus may further comprise: freeing means for freeing, when (1) a specified number of trays that each (a) hold a first type address or (b) are prohibited from being used, cannot be used, and (2) a request for use of a new tray is received, the trays that are prohibited from being used.

The garbage collection apparatus with this construction, in addition to the above effects, enables trays, about which mistaken assumptions are likely to be made, but which are no longer in use, to be recycled effectively.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1 shows the construction of a heap memory used by the garbage collector in an embodiment of the present invention;

FIG. 18 shows the condition of cells immediately following the performance of operations I and II in table 2;

FIG. 19 shows the condition of cells immediately prior to the processing performed by the scavenging unit 442 at S34 (see FIG. 12) when an operation IV is performed following an operation III;

FIG. 20 shows the condition of cells immediately prior to processing performed by the scavenging unit 442 at S45, when the operation IV is performed;

FIG. 21 shows the condition of cell immediately following processing performed by the scavenging unit 442 when the operation IV is performed;

FIG. 22 shows the condition of cells immediately prior to processing performed by the compaction unit 443 at S61 (see FIG. 13), when the operation IV is performed;

FIG. 23 shows the condition of cells immediately following processing performed by the compaction unit 443, when operation IV is performed;

FIG. 27 shows the construction of a heap memory used by the garbage collector;

DESCRIPTION OF THE PREFERRED EMBODIMENTS

The following is a description of the preferred embodiments of the present invention, with reference to the drawings.

First Embodiment

The following is a explanation of a garbage collector in a first embodiment of the present invention, with reference to the drawings.

Figure 2:
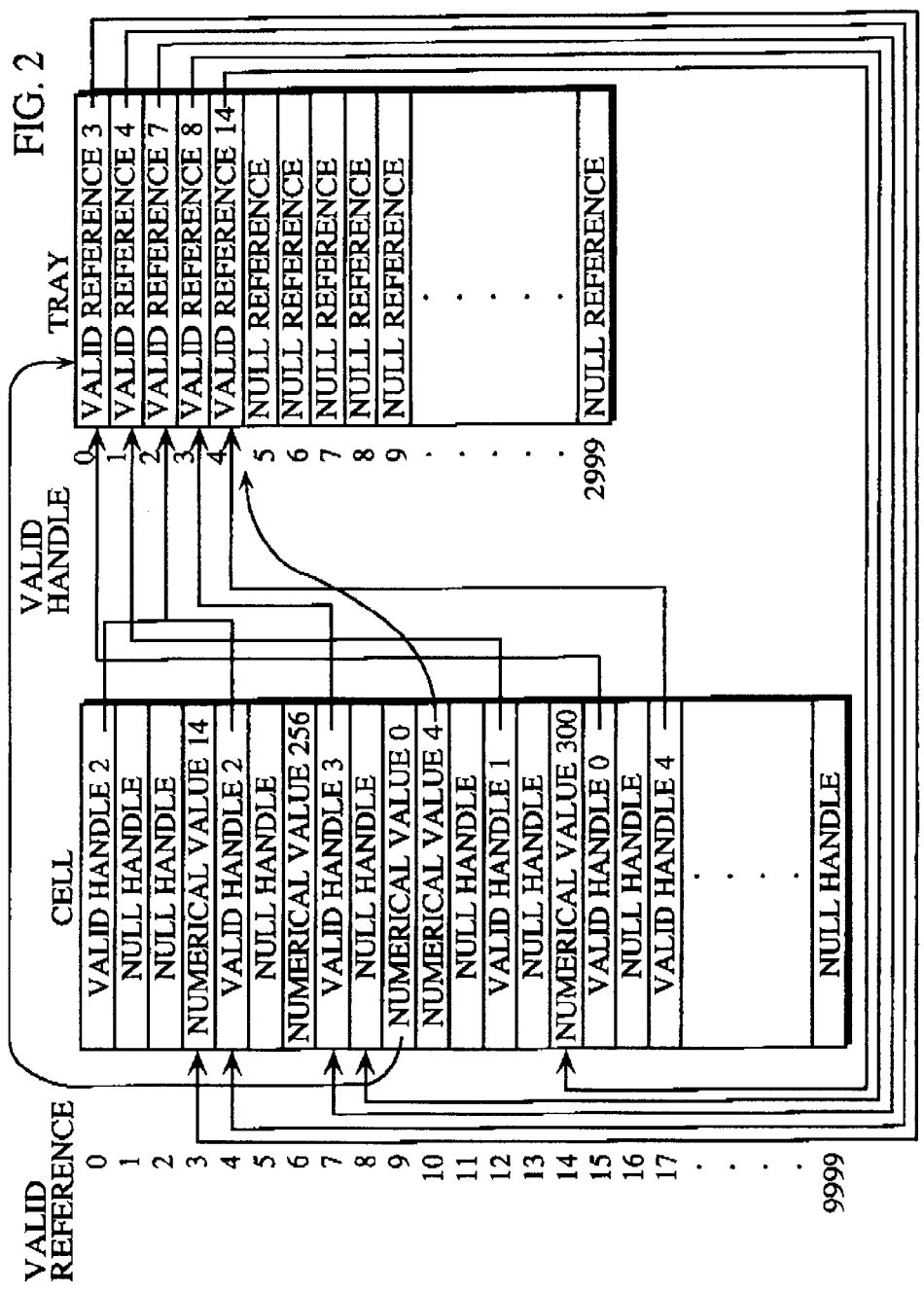
FIG. 2 shows an example of content stored in cells forming the heap, and☐reference relationships between the cells.

FIG. 1 shows the construction of a heap memory (hereafter 'heap') used by the garbage collector, and FIG. 2 shows an example of content stored in cells forming the heap, and reference relationships between the cells.

The heap includes a cell array, and a tray array, as shown in FIG. 1. Each cell holds a numerical value or a handle, and each tray holds a reference. The garbage collector manages the condition of cells using valid references stored in the trays.

As shown in FIG. 2, references may be valid references indicating cell addresses, and NULL references that do not indicate cell addresses, while handles may be valid handles indicating addresses for trays that store valid references, or NULL handles that do not indicate trays.

Here, a cell with a valid reference 0 and a cell with a valid reference 4 are shown as holding the valid handle 2, and indicate a tray with a valid handle 2, while a cell with a valid reference 7 stores a valid handle 3 and indicates a tray with the valid handle 3. Similarly, cells with valid references 12, 15, and 17 respectively hold valid handles 1, 0, and 4, indicating trays with correspondingly numbered valid handles. In FIG. 2, these reference relationships between cells and trays are shown by polygonal lines.

FIG. 2 also indicates, using polygonal lines, cells having valid references held by trays. A tray with a valid handle 0 holds a valid reference 3, one with a valid handle 1 holds a valid reference 4, one with a valid handle 2 holds a valid reference 7, one with a valid handle 3 holds a valid reference 8, and one with a valid handle 4 holds a valid reference 14, so that each indicates a cell having a corresponding valid reference.

The garbage collector of the present invention makes assumptions regarding whether the content of a cell is a numerical value or a handle, and whether a given cell block can be traced (reached) from a root cell block, performs scavenging based on the assumption results, and then performs compaction on a heap on which scavenging (relocation of reachable objects) has already been performed, based on the assumptions. This garbage collector is characterized by having the ability to prevent handles from being mistakenly assumed to be numerical values.

However, although the garbage collector does not mistakenly assume that handles are numerical values, there is still a possibility of it mistakenly assuming numerical values to be handles. For example, in FIG. 2, the curved lines from a cell with a valid reference 9 to a tray with a valid handle 0, and from a cell with a valid reference 10 to a tray with a valid handle 4 indicate that the garbage collector has mistakenly assumed what are actually numerical references to be handles.

Suppose that a processor handles a plurality of data memory spaces, and that a single data memory space having a 32-bit address space is occupied by a data segment and an extra segment, cells being allocated to the data segments and trays being allocated to the extra segments. In such a case, the garbage collector checks a tray in the extra segment specified by the value held by a cell, and assumes that the value held by the cell is either a valid handle or a numerical reference, according to whether the tray holds a valid reference or not.

Alternatively, suppose that the processor handles just one data memory space, in which, for example, addresses 3000 to 12999 are allocated to cells, and addresses 0 to 2999 to trays. In this case, the garbage collector checks whether a value held by a cell corresponds to a tray address, and whether the tray holds a valid reference. If the value corresponds to a tray address, and the tray holds a valid reference, the value held by the cell is assumed to be a valid handle.

Figure 3:
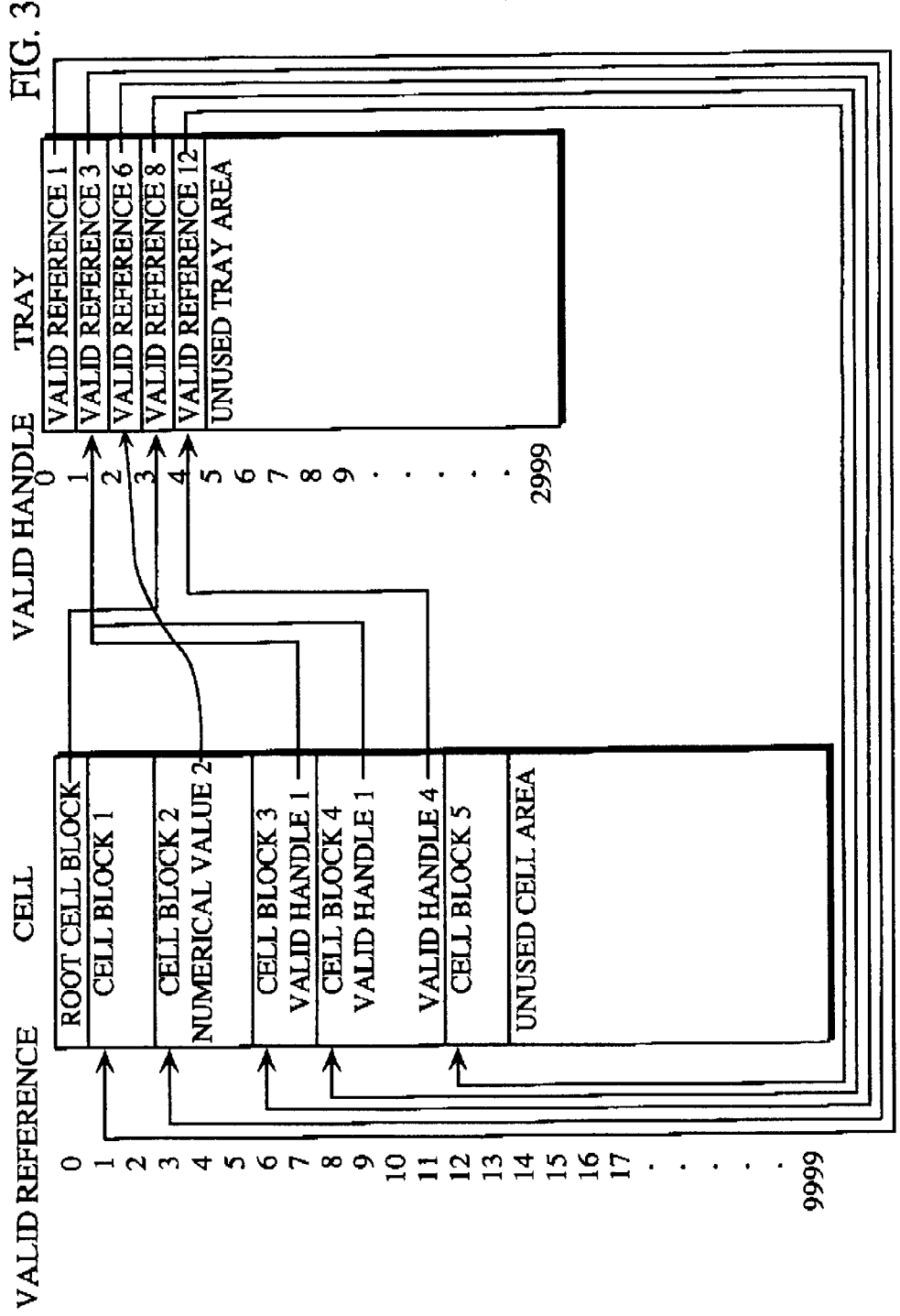
FIG. 3 shows an example of cell blocks, each formed from a plurality of cells, and the reference relationships between the cell blocks.

FIG. 3 shows an example of cell blocks, each formed from a plurality of cells, and the reference relationships between the cell blocks.

A specific cell block reserved in the heap is known as the root cell block, cells that are not part of any cell block as unused cells, and an area that is formed from a plurality of continuous unused cells as an unused cell area. In addition, trays holding NULL references are known as unused trays, and an area that is formed from a plurality of continuous unused trays as an unused tray area.

A cell block A holds a valid handle, and the tray indicated by this valid handle holds a valid reference, which indicates a start cell in a cell block B. Here, cell block A is said to 'reference' cell block B. The heap includes n cell blocks X1 to Xn, and each of cell blocks Xi (i=1, 2, ..., n−1) reference each of cell blocks Xi+1. Here, a 'trace' can be performed from cell block X1 to cell block Xn.

In FIG. 3, a root cell block references a cell block 4 via a tray with a valid handle 3, a cell block 3 references a cell block 2 via a tray with a valid handle 1, a cell block 4 references a cell block 2 via a tray with a valid handle 1, and a cell block 5 via a tray with a valid handle 4. These references are shown by polygonal lines. A tray with a valid handle 0 holds a valid reference 1 and references a cell block 1, but is not referenced by any other cell block.

A cell with a valid reference 4, included in the cell block 2, holds a numerical value 2, but the garbage collector mistakenly assumes this numerical value to be a handle, and this is illustrated by a curved line.

When a new memory block is required, an application allocates a cell block with the required number of cells from the unused cell area (this operation may also be performed by the garbage collector, as is described later in this specification), and sets the cell block so that a trace can be performed from a root block. This is known as 'reserving a cell block'.

As the application is operated it may become impossible for it to reserve cell blocks having the required size in the heap. Here, the garbage collector performs scavenging and compaction, enabling the application to reserve cell blocks of the required size in the heap.

Figure 4B:
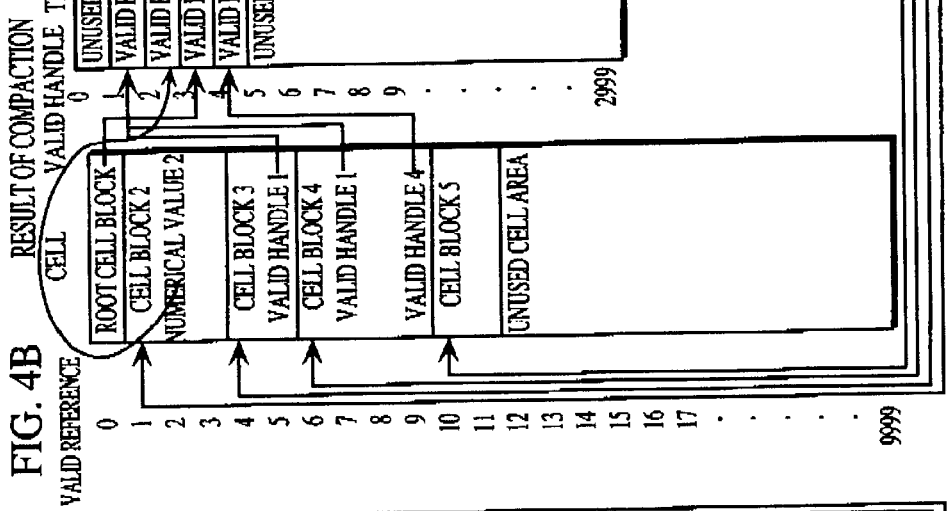
FIGS. 4A and 4B illustrate garbage collection performed on a heap in the state shown in FIG. 3.
Figure 4A:
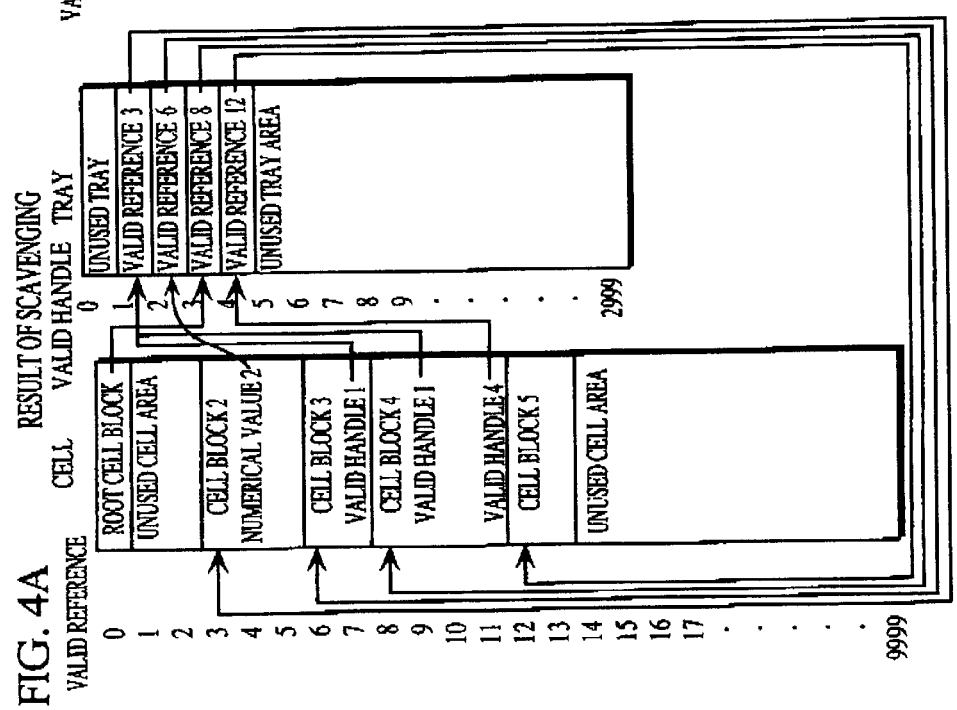

FIG. 4 illustrates garbage collection performed on a heap in the state shown in FIG. 3. FIG. 4A shows the result of scavenging performed on the heap shown in FIG. 3, and FIG. 4B shows the result of compaction performed on the heap shown in FIG. 4A.

In FIG. 4A, the garbage collector updates the content of the tray with the valid handle 0 that is not referenced by any of the cell blocks from a valid reference 1 to a NULL reference. As a result, the tray becomes an unused tray, and the cell block 1 is no longer indicated by the valid handle 0, and is freed to become part of the unused cell area.

Cell blocks 2 to 5, which can be traced from the root cell block, are not freed, and remain allocated. In addition, the trays with valid handles 2, 1, 3, and 4, which are used as references between these cell blocks, are not freed and remain allocated.

When performing compaction on the heap shown in FIG. 4A, the garbage collector, as shown in FIG. 4B, shifts cell blocks 2 to 5 forward by an amount corresponding to the size of the freed cell block 1, while preserving references from the root cell block to cell block 4, from cell block 3 and cell block 4 to cell block 2, and from cell block 4 to cell block 5, as well as a mistakenly assumed reference from cell block 2 to cell block 3. As a result, the unused blocks corresponding to the cell block 1 can be integrated into the subsequent unused cell area.

When cell blocks are shifted forward in this way, the values of a valid handle 3 held in a cell with a valid reference 0, a valid handle 1 held in cells with valid references 7 and 9, and a valid handle 4 held in a cell with a valid reference 11, as well as that of a numerical value 2 held in a cell with a valid reference 4 are not updated. However, the valid references 8, 3, 12, and 6 held in trays with corresponding valid handles are updated respectively to valid references 6, 1, 10, and 4.

Next, the scavenging performed by the garbage collector in the present embodiment is explained in detail.

Figure 5:
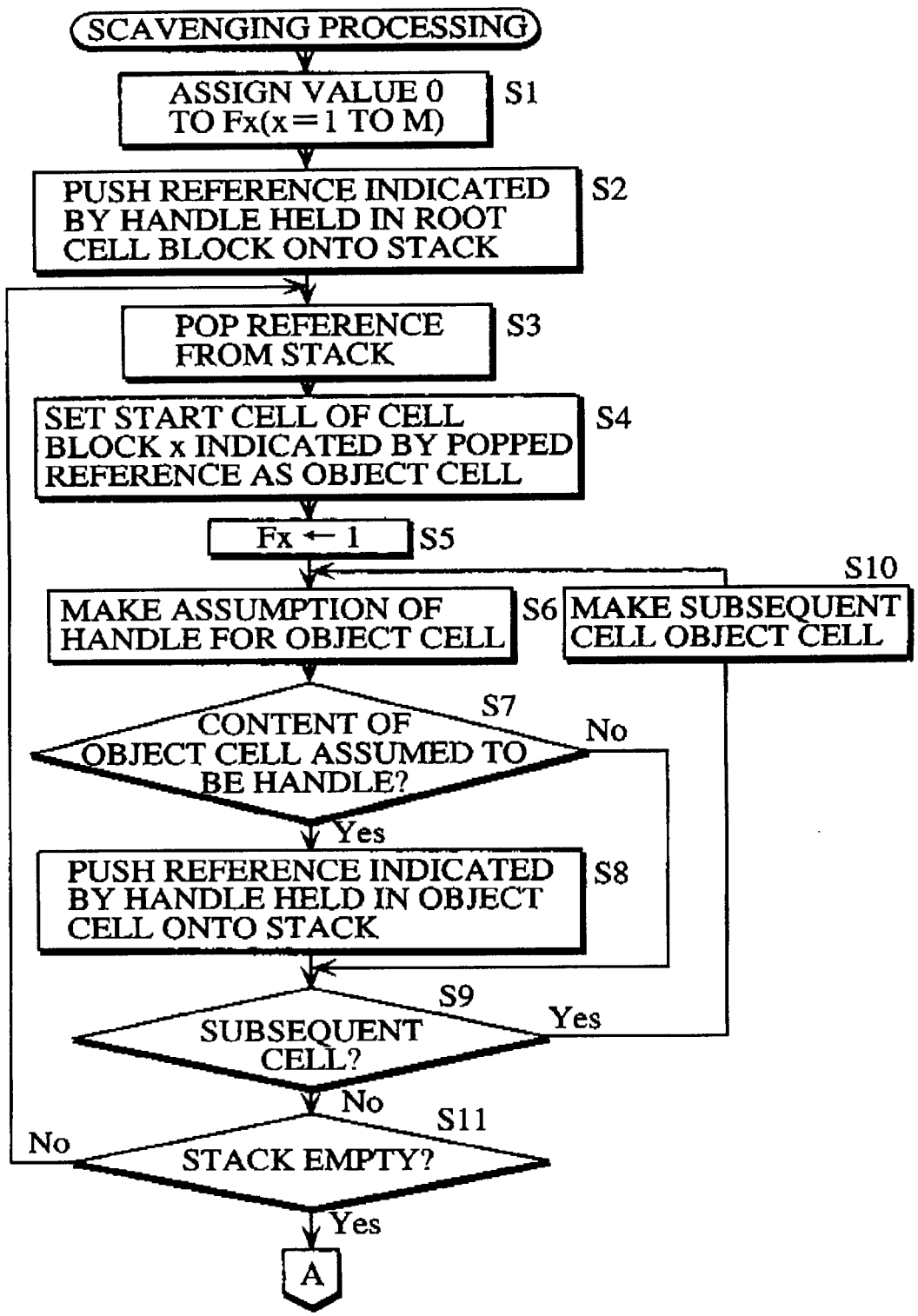
FIG. 5 shows a first flowchart of the scavenging process performed by the garbage collector.
Figure 6:
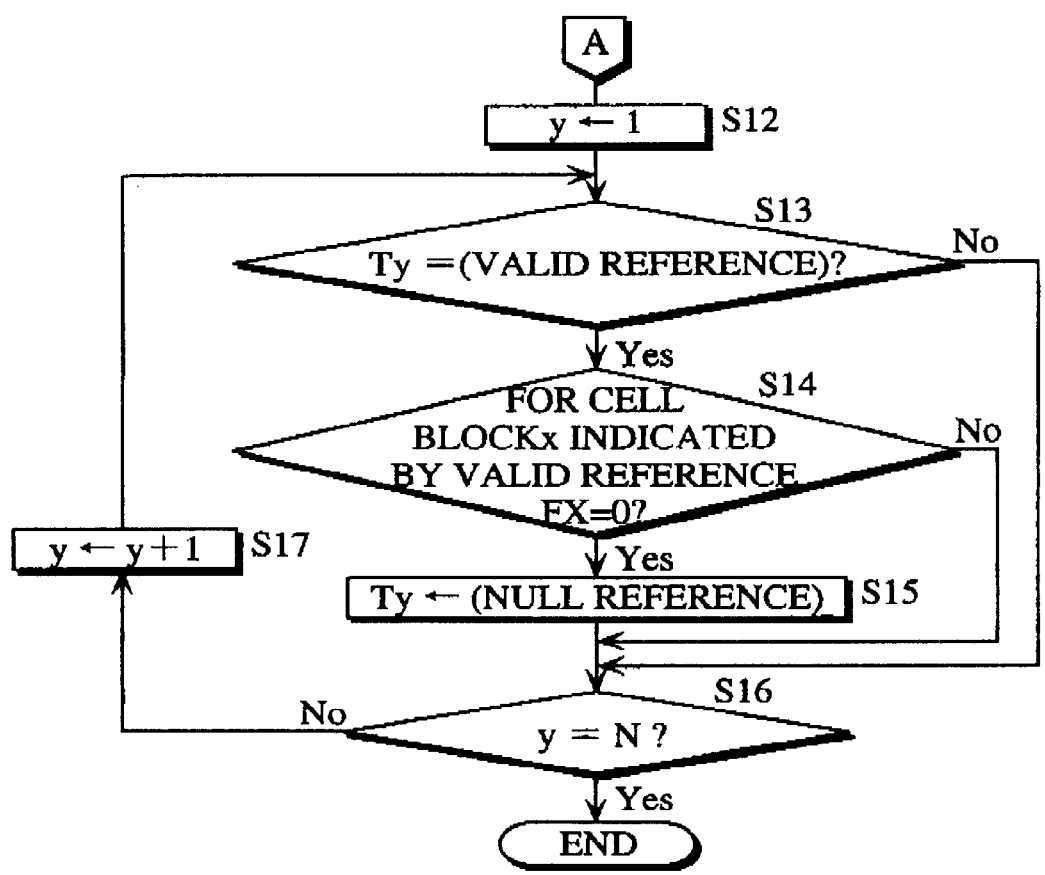
FIG. 6 shows a second flowchart of the scavenging process performed by the garbage collector.

FIGS. 5 and 6 show a flowchart of the scavenging process performed by the garbage collector.

The garbage collector set an 'in use' flag Fx for a cell block x at 0 (S1), and pushes a reference indicated by a handle held in the root cell block onto the stack (S2). The 'in use' flag Fx is set for each cell block to indicate whether that particular cell block can be traced from the root cell block. Here, x=1, 2, ..., M, M being a number of individual cell blocks.

The garbage collector pops a reference accumulated in the stack (S3), and sets a start cell of a cell block x indicated by the popped reference as an object cell (S4). Then the garbage collector sets the 'in use' flag Fx for cell block x at 1 (S5).

Next, the garbage collector makes an assumption regarding the content of the object cell (S6), and determines whether the content of the cell is assumed to be a handle (S7). If content of the object cell is assumed to be a handle (S7, Yes), the garbage collector pushes a reference indicated by the handle onto the stack (S8), and continues on to the processing of S9. If, however, the content of the object cell is not assumed to be a handle (S7, No), the garbage collector omits the processing of S8 and moves to the processing of S9.

At S9, the garbage collector determines whether a subsequent cell exists in the same cell block, and if such a cell exists (S9, Yes), makes this cell the object cell (S10), and then repeats the processing of S6 onward. If a subsequent cell does not exist (S9, No), the garbage collector determines whether the stack is empty (S11). If the stack is not empty (S11, No), the garbage collector repeats the processing of S3 onward, and if the stack is empty (S11, Yes), continues on to the processing of S12, in FIG. 6.

At S12, the garbage collector assigns a value 1 to y and determines whether the content of a tray with the handle y is a valid reference (S13). If the content of the tray with the handle y is a valid reference (S13, Yes), the garbage collector then determines whether the 'in use' flag Fx for the cell block x indicated by the valid reference is 0 (S14). If the 'in use' flag Fx is 0 (S14, Yes), the garbage collector assigns a NULL reference to the tray with the handle y (S15), and then determines whether y is equal to the number of trays N (S16). If the 'in use' flag Fx is not 0 (S14, No), the garbage collector omits the processing of S15, and moves to S16.

If y is not equal to N (S16, No), the garbage collector adds 1 to y (S17), and repeats the processing of S13 onward. If y is equal to N (S16, Yes), the garbage collector ends the processing.

By means of such a scavenging process, the garbage collector can make assumptions as to whether cells contain handles, as well as specifying cell blocks which can be traced from the root cell block. Then the 'in use' flags Fx of the specified cell blocks are set at 1, and all other cell blocks freed to form an unused cell area.

In the garbage collector of the present embodiment, there is a possibility that cell content that is actually a numerical value will be mistakenly assumed to be a handle when the above scavenging processing is performed. However, since intermediate addresses (handles) are used to specify cells, and the content of the trays specified by these handles is updated when compaction is performed, the actual content of the cells themselves is not updated and compaction can be performed effectively.

The following is a summary of the particular characteristics of first to third garbage collectors that are examples of the prior art, and of the garbage collector of the present invention.

TABLE 1

| | Method of Determining Cell Content | Time Required for Scavenging | Compaction Execution? | Time Required For Compaction | Application Execution Load |
|---|---|---|---|---|---|
| 1st Garbage Collector | Reference Flag | Long | Possible | Long | Large |
| 2nd Garbage Collector | Reference Flag | Long | Possible | Short | Large |
| 3rd Garbage Collector | Assumption | Short | Impossible | | Small |
| Invention | Assumption | Short | Possible | Short | Small |

Each 4-byte cell requires, for example, a 1-bit reference flag, but in order to use the heap more effectively, reference flags for eight cells are grouped together. When a value is assigned to a cell during execution of an application, a reference flag indicating whether the cell contains a reference or a numerical value needs to be set, and accessing such reference flags is time-consuming. Furthermore, when scavenging is performed, the garbage collector must check whether the cell value is a reference or a numerical value, and accessing such reference flags is also time-consuming.

As shown in Table 1, the first and second prior art garbage collectors use reference flags to determine cell content. These garbage collectors use reference flags when exchanging information with an application and refer to reference flags when performing scavenging. As a result, the load placed on the processor by application execution and the load required for scavenging are increased. If a processor having a fixed throughput is used for processing, a greater amount of time will be required to perform this processing.

In contrast to the first and second prior art garbage collectors, the third prior art garbage collector and the garbage collector of the present invention are conservative garbage collectors that make assumptions when determining the content of cells. If such a garbage collector is used, there is no need to use reference flags when an application is executed, or to refer to reference flags when scavenging is performed. Consequently, the processing load required during both program execution and scavenging is reduced, and processing can be performed in a shorter time.

The third prior garbage collector is unable to perform compaction due to the fact that mistaken assumption may have been made regarding cell content during scavenging. However, the scavenging performed by the garbage collector of the present invention is such that a conservative garbage collector capable of performing compaction can be realized.

The following is an explanation of an actual example of the garbage collector in the present invention, realized in a reservation system that reserves seats in response to input from a user terminal.

Figure 7:
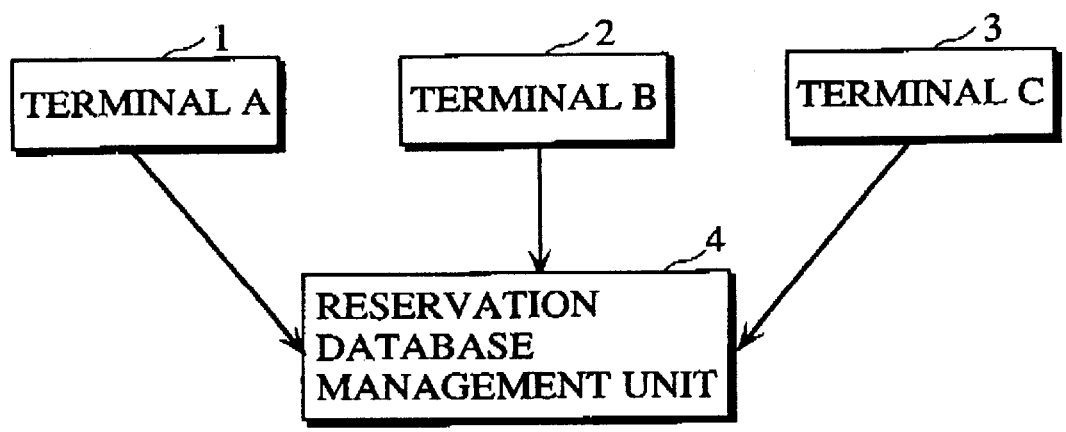
FIG. 7 shows an outline structure of a reservation system using the garbage collector of the present invention
Figure 8:
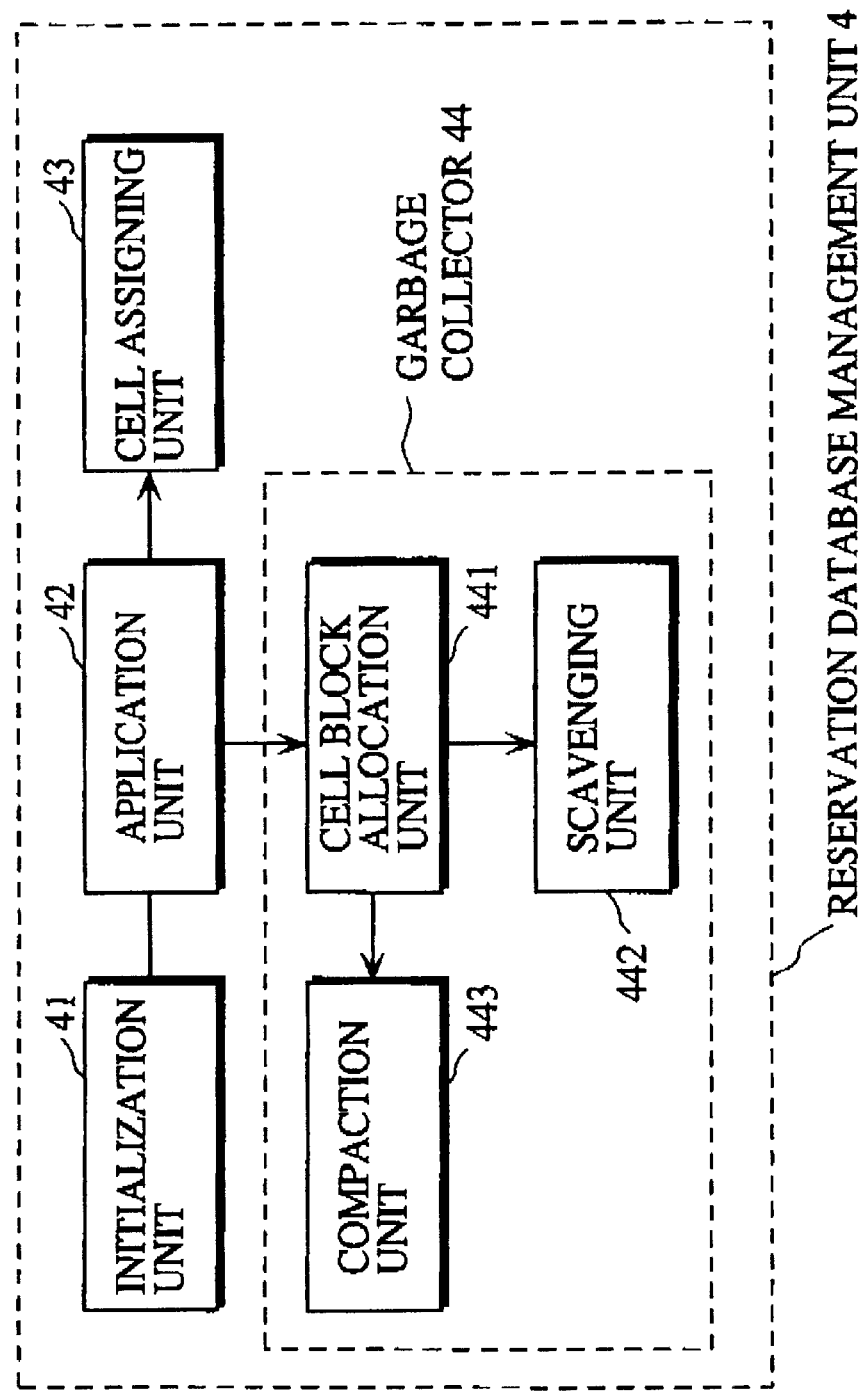
FIG. 8 shows a structure of a reservation database management unit 4 included in the reservation system.

FIG. 7 shows an outline structure of a reservation system using the garbage collector of the present invention, and FIG. 8 shows a structure of a reservation database management unit 4 included in the reservation system.

The reservation system includes a terminal A1, a terminal B2, a terminal C3, and a reservation database management unit 4, as shown in FIG. 7. In the reservation system, reservation requests specifying a number of seats required are made to the reservation database management unit 4, in response to an input specifying a number of seats made by a user of one of terminals A1, B2 and C3. The reservation database management unit 4 provisionally reserves two candidate sets of seat numbers with the required number of seats, and sends these two candidates back to the terminal from which the reservation request originated. Once the two candidates are received, a user selects one candidate by making an input into the terminal, and the terminal informs the reservation database management unit 4 of the user selection. The reservation database management unit 4 confirms the reservation of the candidate selected by the user, and ends the reservation process.

The reservation database management unit 4 includes an initialization unit 41, an application unit 42, a cell assigning unit 43, and a garbage collector 44. The initialization unit 41 initializes cells used to execute a reservation. The application unit 42 controls overall operations and reserves a number of seats desired by a user. The cell assigning unit 43 assigns values to cells in a cell block. The garbage collector 44 allocates cell blocks in the memory in accordance with requests made by the application unit 42 and performs garbage collection when required. The garbage collector 44 includes a cell block allocating unit 441 that allocates cell blocks, a scavenging unit 442 that performs the scavenging described above, and a compaction unit 443 that performs the compaction described above.

The application unit 42, initialization unit 41, cell block allocation unit 441, scavenging unit 442, compaction unit 443, terminals A1 to C3, and cell assigning unit 43 perform the processing shown in FIGS. 9 to 17. Seat reservation is executed while the garbage collector 44 reserves memory required by the application unit 42, and performs scavenging and compaction as necessary.

Cell blocks used when executing the processing shown in FIGS. 9 to 17 are sectional arrays within the cell array, a reference address for a start cell being x, and required cell block length n. These have the following structure.

C[x]=start reference for a next cell block

C[x+1]=n(=required cell block length)

C[x+2]='in use' flag or work used in compaction

C[x+3] to C[x+2+n]=cell block content that can be freely used by the application.

Here, a root cell block contains the following cells. The relevant values are assigned by the initialization unit 41.

C[1]=5

C[2]=1

C[3]=NULL

C[4]=NULL

When a reservation is executed by the reservation system, the garbage collector 44 performs operations that are independent of the operation of the application, apart from allocating cell blocks in response to requests from the application. The garbage collector 44 performs scavenging and compaction in response to requests from the application. In addition, the garbage collector 44 performs processing only on a cell block that has been identified as having the structure described above. The scavenging unit 442 does not determine in advance whether the content of a cell block is a numerical value or a handle, but makes assumptions regarding cell content.

Thus, the garbage collector 44 does not know the exact content of cell blocks used by the application, and the application uses a system cell block and candidate cell blocks having the following data structure in order to execute reservations.

System Block (start cell reference is x0)

C[x0] to C[x0+2]=values corresponding to the above C[x] to C[x+2]

C[x0+3]=handle of a cell storing a reference to a candidate cell block for terminal A1

C[x0+4]=handle of a cell storing a reference to a candidate cell block for terminal B2

C[x0+5]=handle of a cell storing a reference to a candidate cell block for terminal C3 Candidate Cell Block for a Terminal t (=A, B, C)

C[xt] to C[xt+2]=values corresponding to the above C[x] to C[x+2]

C[xt+3]=number of reserved seats

C[xt+4] to C[xt+3+number of reserved seats]=seat numbers of seats provisionally reserved as a candidate 1

C[xt+4+number of reserved seats] to C[xt+3+2□number of reserved seats]=seat numbers of seats provisionally reserved as a candidate 2

The following numerical references are used in the flowcharts and related explanation.

C: cell array

N: number of cells (size of cell array)

C[1] to C[N]: cell

T: tray array

M: number of trays (size of the tray array)

T[1] to T[M]: tray

NULL: numerical value 0

U: start reference of an unused cell block

W: work performed at compaction

S: reference stack

Figure 9:
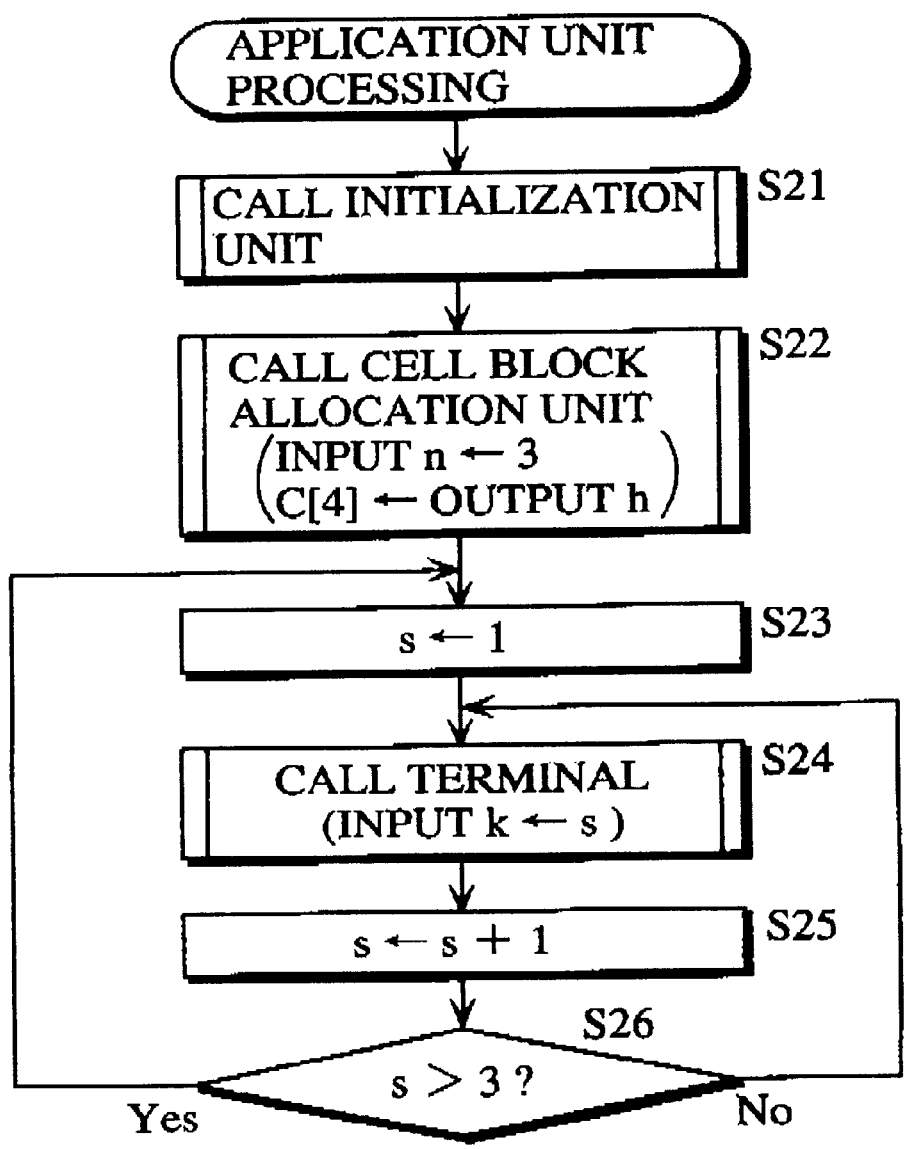
FIG. 9 is a flowchart showing processing performed by the application unit 42.
Figure 10:
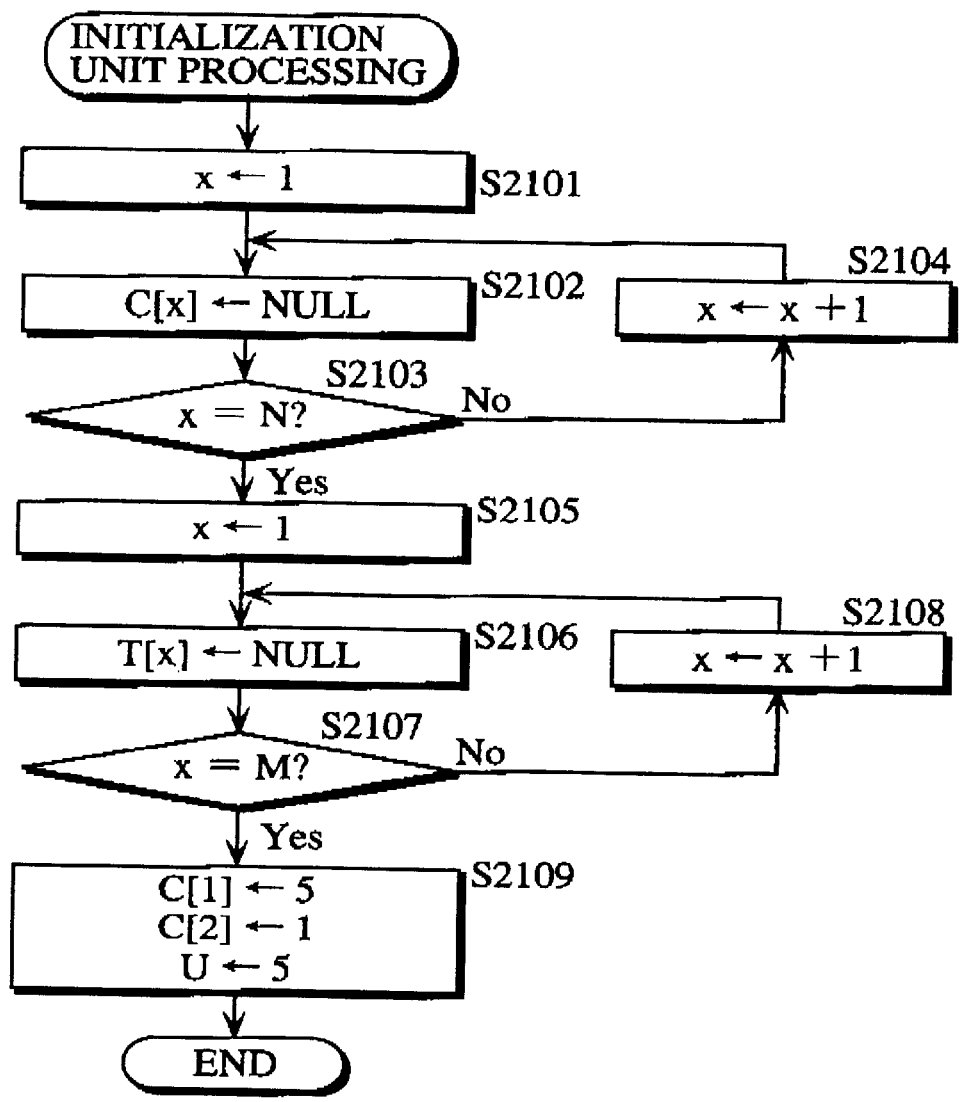
FIG. 10 is a flowchart showing processing performed by the initialization unit 41.

FIG. 9 is a flowchart showing processing performed by the application unit 42, and FIG. 10 is a flowchart showing processing performed by the initialization unit 41.

In the processing shown in FIG. 9, the application unit 42 calls the initialization unit 41, initializes a cell block in the memory, and sets a root cell block (S21). Next, the application unit 42 sets a required number of cells n at 3, and calls the cell block allocation unit 441. The application unit 41 assigns a handle h obtained as a result of processing performed by the cell block allocation unit 441 to C[4], thereby reserving the system block (S22).

Then, the application unit 42 assigns 1 to s (S23), assigns s to a variable k to be used in processing, and calls a terminal s (s=1, 2, 3) (S24). The terminal s responds to a reservation request made by a user and performs provisional and confirmed seat reservation in turn by performing processing such as cell block allocation and assigning values to cell blocks, with garbage collection being performed as necessary. This process is explained later in this specification in more detail, with reference to FIGS. 15 and 16. Once the terminal s has been called, the application unit 44 adds 1 to s (S25). The application unit 44 then repeats the processing from S23 (S26, Yes) or from S24 (S26, No), depending on whether the value of s is greater than or smaller than 3, and calls terminals A1, B2 and C3 in turn.

In the processing of S21, the application unit 42 calls the initialization unit 41. Here, as shown in FIG. 10, the initialization unit 41 assigns a value 1 to x (S2101), and NULL value to C[x] (S2102). Then, the initialization unit 41 determines whether x is equal to a number of cells N (S2103). If x is not equal to N (S2103, No), the initialization unit 41 adds 1 to x (S2104), and repeats the processing from S2102 onward. If x is equal to N (S2103, Yes), the initialization unit 41 continues on to S2105. The processing of S2101 to S2104 is performed to initialize all of the cells C[1] to C[N] by setting them at NULL.

Following this, the initialization unit 41, at S2105, assigns 1 to x once again, and assigns NULL to T[x] (S2106). Then, the initialization unit 41 determines whether x is equal to a number of trays M (S2107). If x is not equal to M (S2107, No), the initialization unit 41 adds 1 to x (S2108) and repeats the processing of S2106 onward. If x is equal to M (S2107, Yes), the initialization unit 41 continues on to S2109. The processing of steps S2105 to S2108 is performed to initialize all of the trays T[1] to T[M] by setting them at NULL.

At S2109, the initialization unit 41 sets a root cell block by assigning 5 to C[1] and 1 to C[2], and assigns 5 to a start reference U for an unused cell block (S2109). This completes the processing performed by the initialization unit 41. Following this, the processing of S22, in which the cell block allocation unit 441 is called by the application unit 42, is performed.

Figure 11:
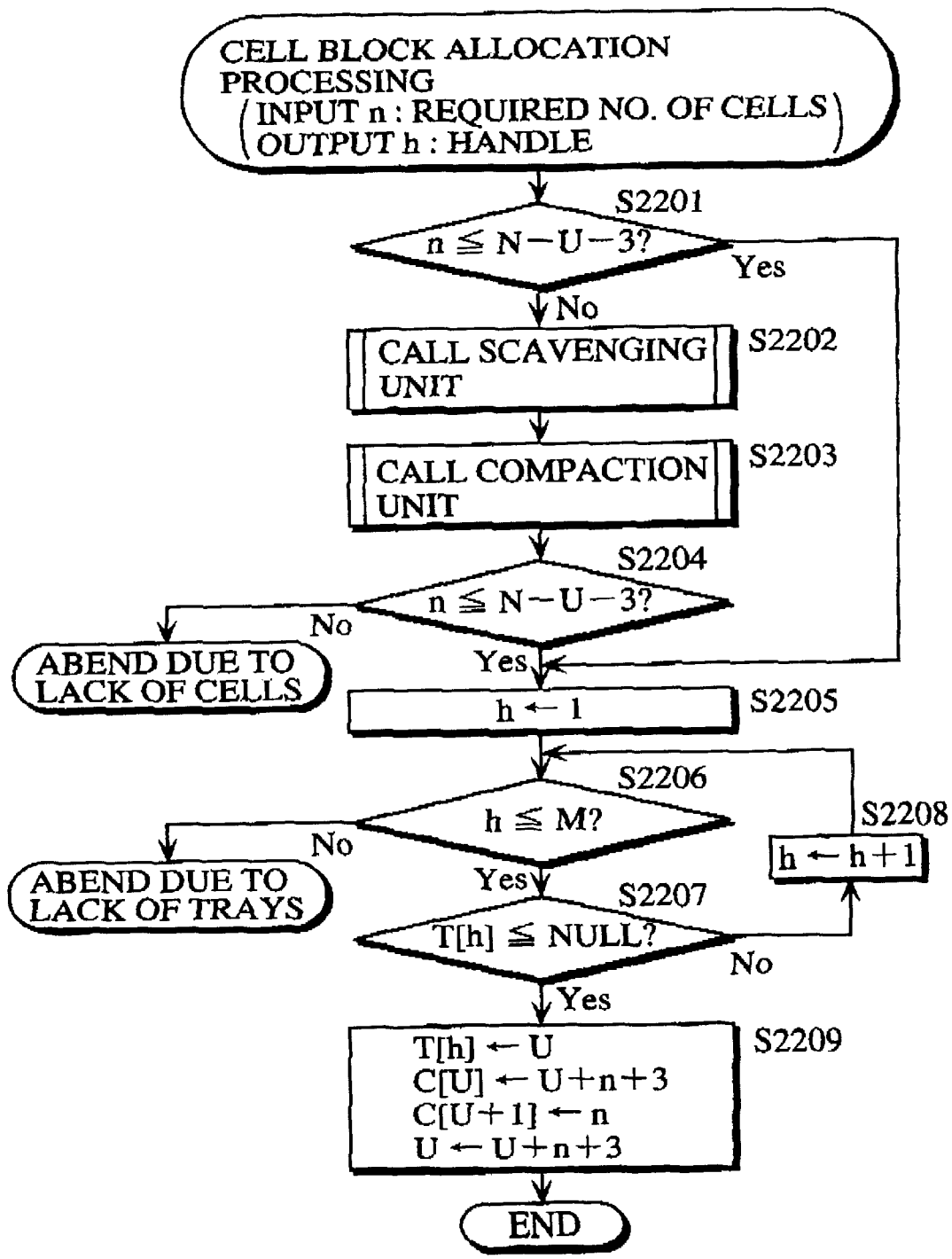
FIG. 11 is a flowchart showing processing performed by the cell block allocation unit 441.
Figure 12:
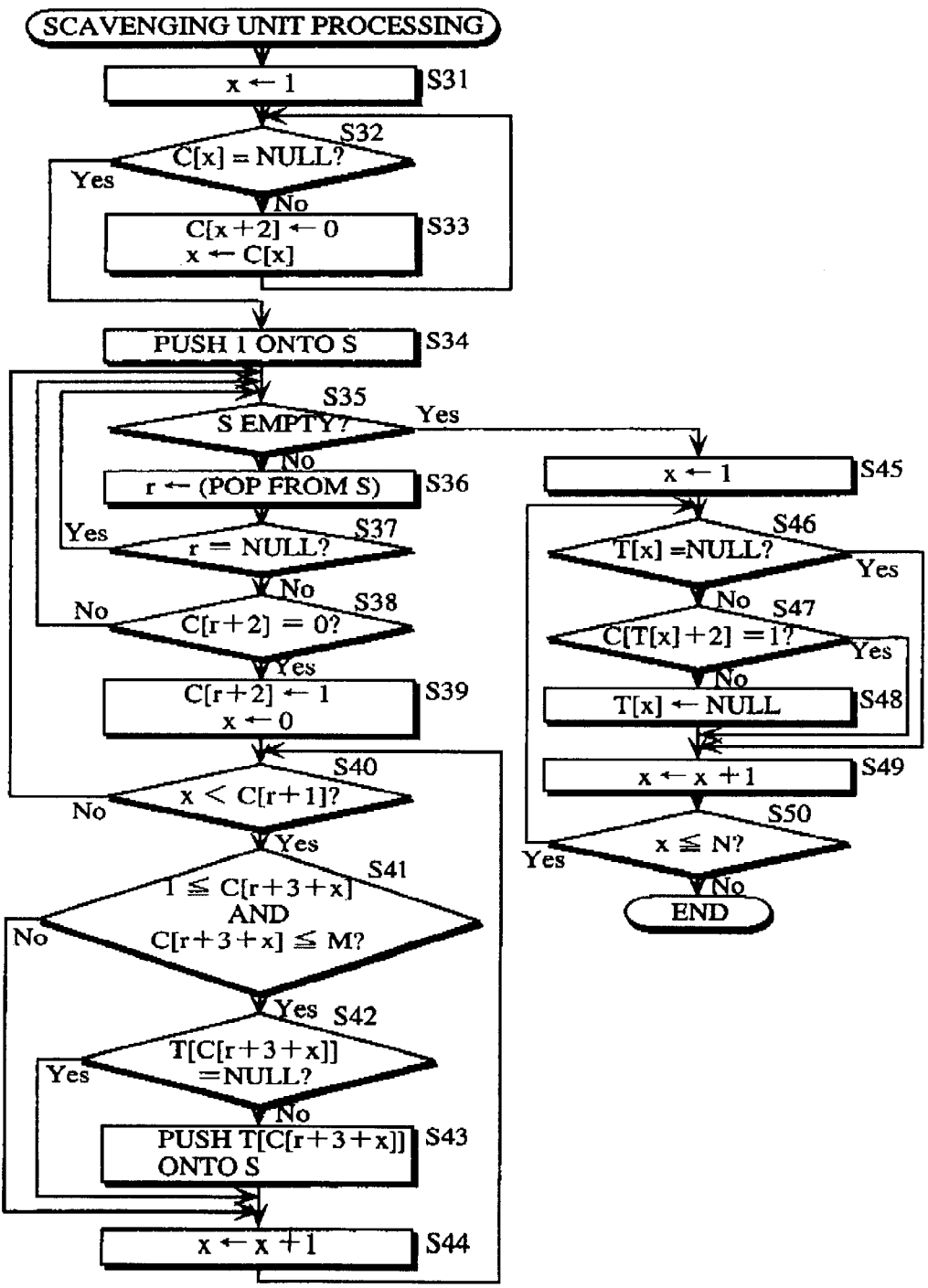
FIG. 12 is a flowchart showing processing performed by the scavenging unit 442 called by the cell block allocation unit 441.
Figure 13:
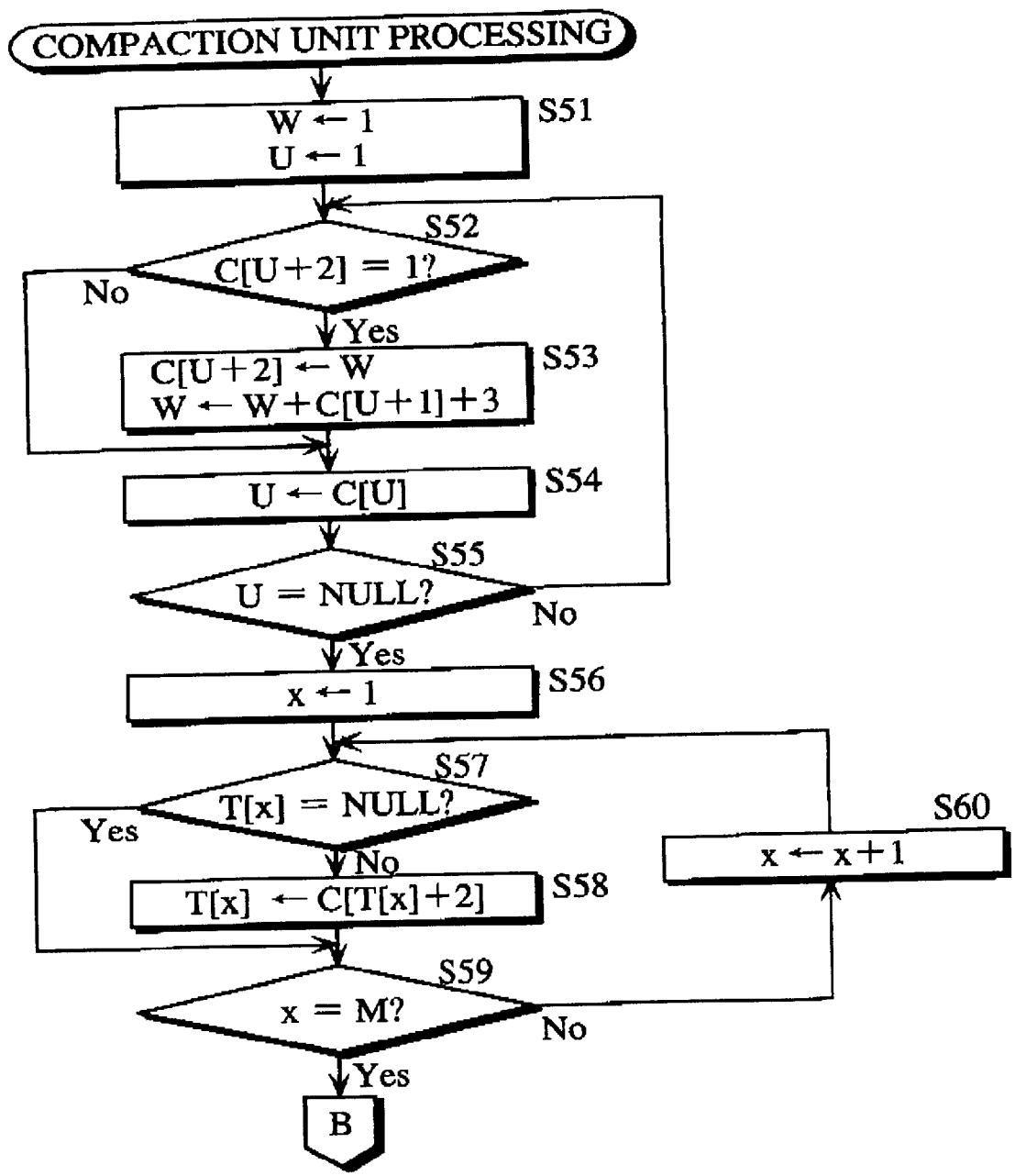
FIG. 13 shows a first flowchart of processing performed by the compaction unit 443 called by the cell block allocation unit 441.
Figure 14:
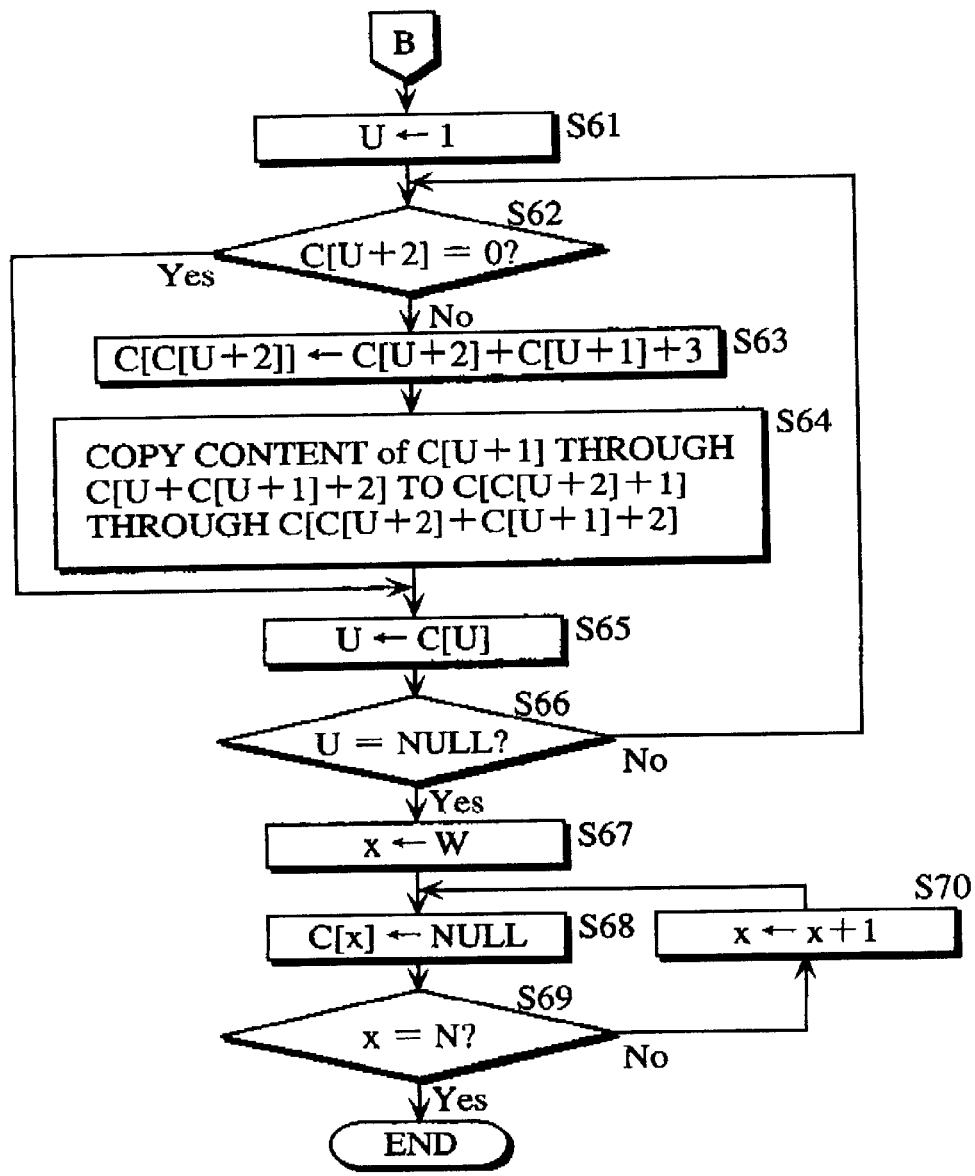
FIG. 14 shows a second flowchart of processing performed by the compaction unit 443 called by the cell block allocation unit 441.

FIG. 11 is a flowchart showing processing performed by the cell block allocation unit 441, FIG. 12 is a flowchart showing processing performed by the scavenging unit 442 called by the cell block allocation unit 441, and FIGS. 13 and 14 show a flowchart of processing performed by the compaction unit 443 called by the cell block allocation unit 441.

In the processing shown in FIG. 11, the cell block allocation unit 441 first determines whether a number of required cells is (N−U−3) or less, in other words whether the required number of cells can be reserved in the memory (S2201). If n is (N−U−3) or less (S2201, Yes), the initialization unit 41 continues on to S2205, but if n is more than (N−U−3) (S2201, No), the cell block allocation unit 441 calls the scavenging unit 442 (that performs the processing shown in FIG. 12) and the compaction unit 442 in turn (S2202, S2203), and determines once again whether n is (N−U−3) or less (S2204). If n is more than (N−U−3) (S2204, No), the process is brought to an abnormal end (ABEND) as there are an insufficient number of cells available for use. If n is no more than (N−U−3)(S2204, Yes) the initialization unit 41 moves to S2205.

At S2205, the cell block allocation unit 441 assigns a value 1 to h, and determines whether h is no more than a number of trays M (S2206). If h is more than M (S2206, No), the process is brought to an abnormal end as there are an insufficient number of trays available for use. If h is no more than M (S2206, Yes), the cell block allocation unit 441 determines whether T[h] is NULL (S2207). If T[h] is not NULL (S2207, No), the cell block allocation unit 441 adds 1 to h (S2208) and repeats the processing of S2206 onward. If T[h] is NULL (S2207, Yes), the initialization unit 41 continues on to step S2209.

If a handle h corresponding to a tray that has not been used in the processing of S2205 to S2208 is specified, a start reference U for an unused cell block is assigned to T[h], a value (U+n+3) to C[U], and a value n to C[U+1], before (n+3) is added to U (S2209), and the processing performed by the cell block allocation unit 441 ends.

In this way, the cell block allocation unit 441 reserves a system cell block in response to a call from the application unit 42 (S22) that specifies a required number of cells 3. Then, the cell block allocation unit 441 outputs a handle h specifying a tray that stores a start reference for the system block, and reserves a candidate cell block in response to a call from one of terminals A1 to C3 (S2411) that sets a required number of cells n at (2□number of seats+1). Next, the cell block allocation unit 441 outputs a handle h specifying a tray that stores a start reference for the newly reserved candidate cell block.

In the processing of S2202 the cell block allocation unit 441 calls the scavenging unit 442. Here, as shown in FIG. 12, the scavenging unit 442 first assigns a value 1 to x (S31), and determines whether C[x] is NULL (S32). If C[x] is not NULL (S32, No), the scavenging unit 442 assigns 0 to C[x+2], updates x to the value shown by C[x] (S3), and repeats the processing from S32 onward. If C[x] is NULL (S32, Yes), processing moves to step S34. Here, C[x+2] is used as an 'in use' flag, and the processing of S31 to S33 sets the 'in use' flag for in use cell blocks at an initial value of 0.

At S34, the scavenging unit 442 pushes a value 1 onto the reference stack S, thereby determining whether the reference stack S is empty (S35). If the reference stack S is not empty (S35, No), a reference stacked in S is popped to r (S36), and the scavenging unit 442 determines whether r is a NULL value (S37). If r is NULL (S37, Yes), the scavenging unit 442 repeats the processing of S35 onward. If r is not NULL (S37, No) the scavenging unit 442 determines whether C[r+2] is 0 (S38) (this is to prevent the structure of the cell block causing an infinite loop to be formed by the processing from S35 onward).

If C[r+2] is not 0 (S38, No), the scavenging unit 442 repeats the processing from S35 onward, and if C[r+2] is 0 (S38, Yes), sets the 'in use' flag for in use cell blocks at 1 by assigning a numerical value 1 to C[r+2], and assigns a value 0 to x (S39).

Next, the scavenging unit 442 determines whether x is smaller than a value C[r+1], in other words whether the following processing has been performed on all the cells included in the cell block (S40). If x is not smaller than C[r+1] (S40, No), the scavenging unit 442 moves to the processing of S35 to perform processing on the next cell block. If x is smaller than C[r+1], (S40, Yes), the scavenging unit 442 then determines whether the value of C[r+3+x] is in a range of 1 to M inclusive (S41), and whether T[C[r+3+x]] is NULL (S42). Only when C[r+3+x] is in a range of 1 to M inclusive (S41, Yes), and T[C[r+3+x]] is not NULL (S42, No), is T[C[r+3+x]] pushed onto the reference stack S (S43). Following this, the scavenging unit 442 updates x by adding 1 (S44), and repeats the processing of S40 onward.

After emptying the reference stack S by tracing the cell blocks in order (S35, Yes), the scavenging unit 442 once more assigns a value 1 to x (S45), and determines whether T[x] is NULL (S46), and whether C[T[x]+2] is 1, in other words whether the 'in use' flag for a cell block indicated by T[x] is 1 (S47).

If T[x] is not NULL (S46, No), and C[T[x]+2] is not 1 (S47, No), the scavenging unit 442 assigns a NULL value to T[x] (S48), and adds 1 to x (S49). If T[x] is NULL (S46, Yes), or C[T[x]+2] is 1 (S47, Yes), the processing of S48 is omitted and S49 performed. The scavenging unit 442 determines whether x is N or less (S50). If x is N or less (S50, Yes), the scavenging unit 442 repeats the processing from S46, and if x is more than N (S50, No), the processing performed by the scavenging unit 442 ends. Following this, at S2203, the cell block allocation unit 441 calls the compaction unit 443 (see FIG. 11).

The processing performed by the scavenging unit 442 in the above S41 and S42 is for making an assumption as to whether a handle or a numerical value is held in a cell block. In other words, when the value held by the cell block is a value that may be taken to be a valid handle, and the tray indicated by this value does not hold a NULL value, the scavenging unit 442 assumes that this value is a handle. Following this assumption, at S43, the scavenging unit 442 pushes the reference held in the tray indicated by the value onto the reference stack S, and assumes that the cell block indicated by this reference is in use. At S45 to S50, the scavenging unit 442 assigns a NULL value to a tray indicating a cell block that is not in use, and this tray becomes an unused tray. The processing of S45 to S50 enables trays to be recycled effectively.

FIGS. 13 and 14 show processing performed by the compaction unit 443. First, the compaction unit 443 assigns a value 1 to work W and U (S51). Then, the compaction unit 443 determines whether C[U+2] is 1, in other words whether an 'in use' flag is 1 (S52). If C[U+2] is 1, the compaction unit 443 assigns W to C[U+2], and adds a value to W. If, however, C[U+2] is not 1, the compaction unit 443 updates U by assigning the value C[U] to U, without updating the values of C[U+2] and W (S54), and then determines whether U is a NULL value (S55). If U is NULL, processing continues on to S56. The processing performed by the compaction unit 443 in S51 to S55 enables a reference for a start cell following shifting of the cell blocks to be calculated, and specified work for each cell block to be stored.

At S56, the compaction unit 443 assigns a value 1 to x, and determines whether T[x] is a NULL value (S57). If T[x] is not NULL (S57, No), the compaction unit 443 assigns a value C[T[x]+2] to T[x]. If T[x] is NULL (S57, Yes), the value of T[x] is not changed. Following this, the compaction unit 443 determines whether x is equal to a number of trays M (S59). If x is not equal to M (S59, No), the compaction unit 443 adds 1 to x (S60), and repeats the processing of S57 onward. If x is equal to M (S59, Yes), the compaction unit 443 continues on to S61. The processing performed by the compaction unit 443 in S56 to S60 enables all of trays T[1] to T[M] to be updated so as to indicate a reference for a start cell following shifting of cell blocks.

At S61, the compaction unit 443 assigns a value 1 to U. Next, the compaction unit 443 determines whether a value of C[U+2] is 0, in other words whether C[U+2] indicates that the cell block is unused (S62).

If the value of C[U+2] is not 0 (S62, No), the compaction unit 443 assigns C[U+2]+C[U+1]+3to C[C[U+2]] (S63). Then, the compaction unit 443 copies the content of C[U+1] through C[U+C[U+1]+2] to each of C[C[U+2]+1] through C[U+2]+C[U+1]+2] respectively (S64), and continues to the processing of S65. If the value of C[U+2] is 0 (S62, Yes), the compaction unit 443 continues to S65 without performing the processing of S63 and S64.

At S65, the compaction unit 443 updates U by assigning a value C[U], and determines whether U is a NULL value (S66). If U is not NULL (S66, No), the compaction unit 443 repeats the processing of S62 onward. If U is NULL, however (S66, Yes), the compaction unit 443 continues on to the processing of S67. The processing of S61 to S66 performed by the compaction unit 443 enables actual shifting of cells to be performed.

At S67, the compaction unit 443 assigns a value W to x, and a NULL value to C[x] (S68), and determines whether x is equal to a number of cells N (S69). If x is not equal to N (S69, No), the compaction unit 443 updates x by adding 1 (S70). If x is equal to N (S69, Yes), the compaction unit 443 ends processing, and processing performed by the cell block allocation unit 441 from S2204 onward (see FIG. 11) can be performed. The processing of S67 to S69 performed by the compaction unit 443 enables a NULL value to be assigned to cells with references from W onward.

The processing performed by the compaction unit 443 enables those cell blocks that the scavenging unit 442 assumes to be unused to be integrated into the unused cell area.

As was previously explained, the application unit 42 calls the terminals A1 to C3, as shown in S24 of FIG. 9.

Figure 15:
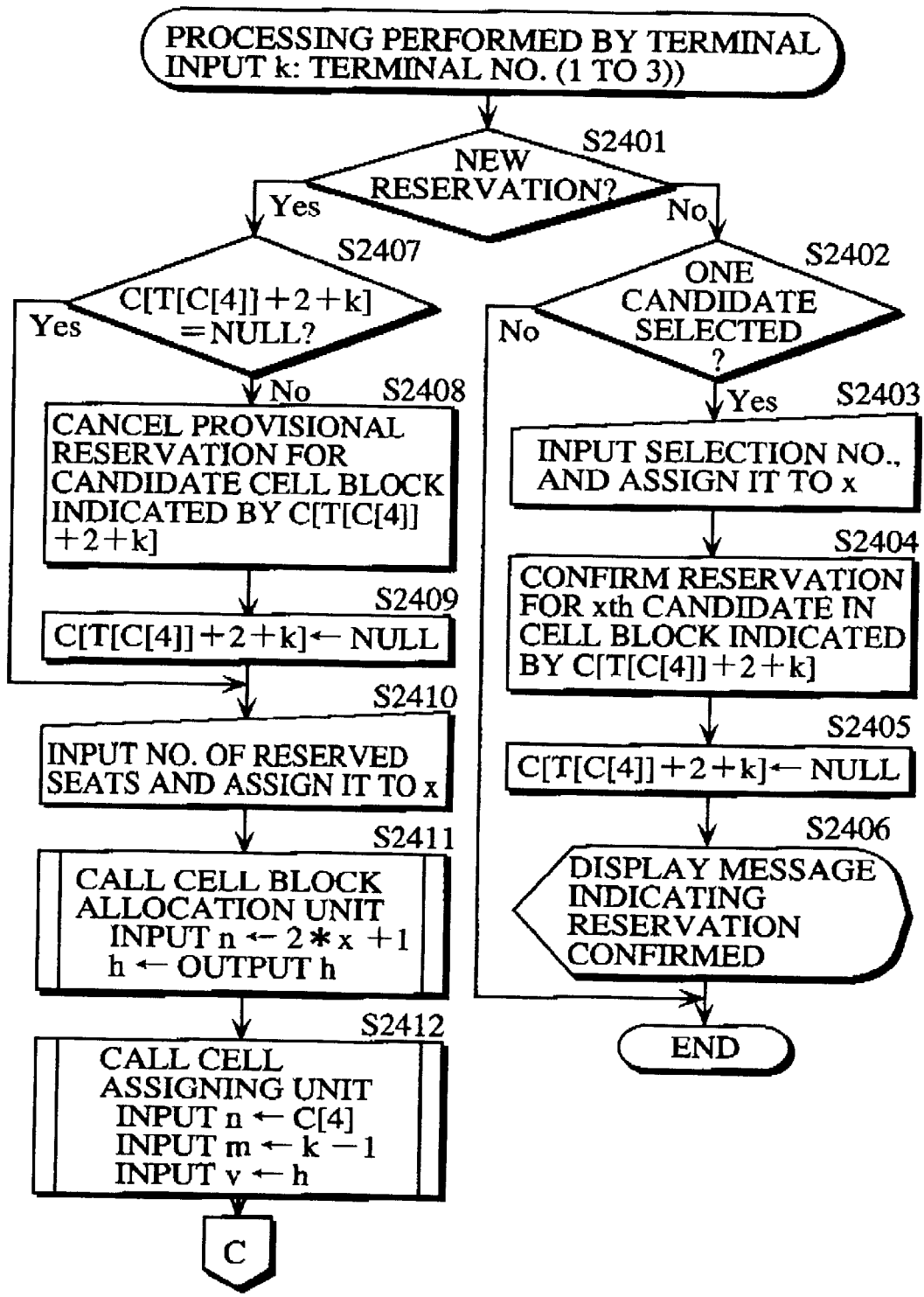
FIG. 15 shows a first flowchart of the processing performed by each of the terminals A1 to C3.
Figure 16:
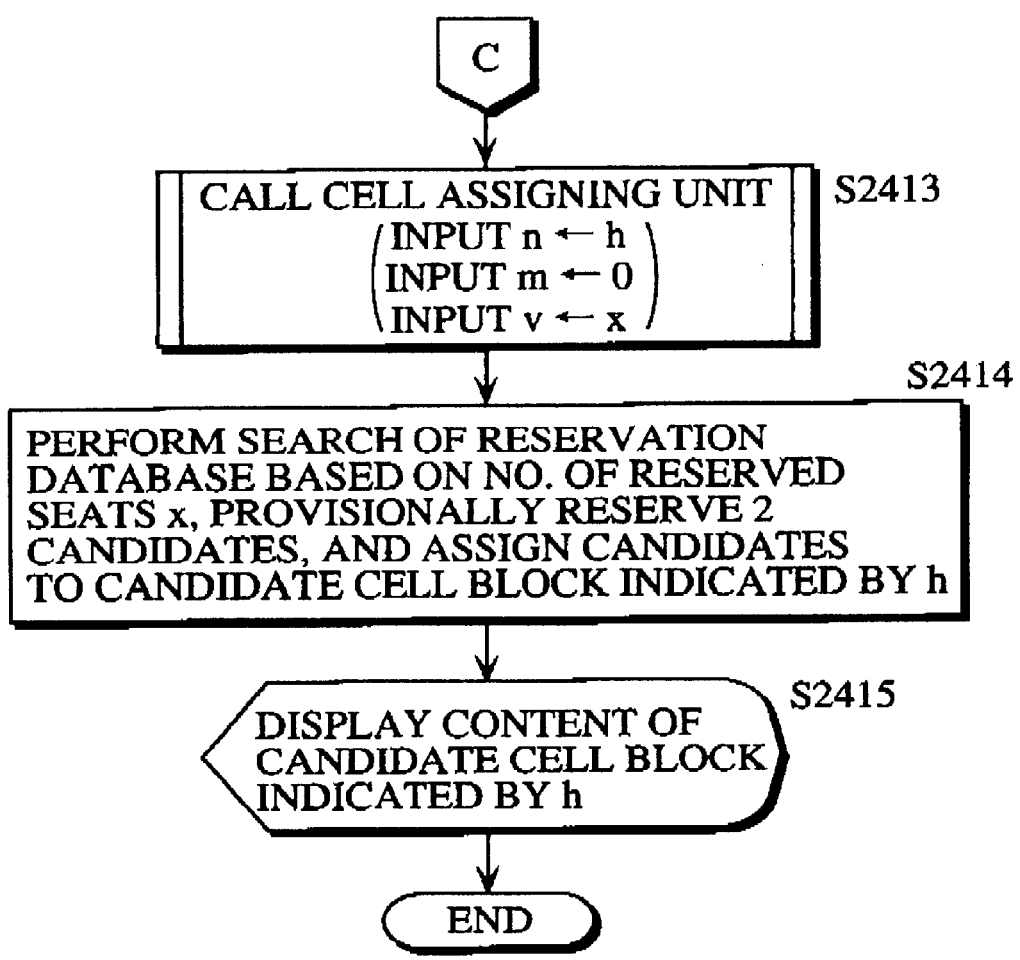
FIG. 16 shows a second flowchart of the processing performed by each of the terminals A1 to C3.
Figure 17:
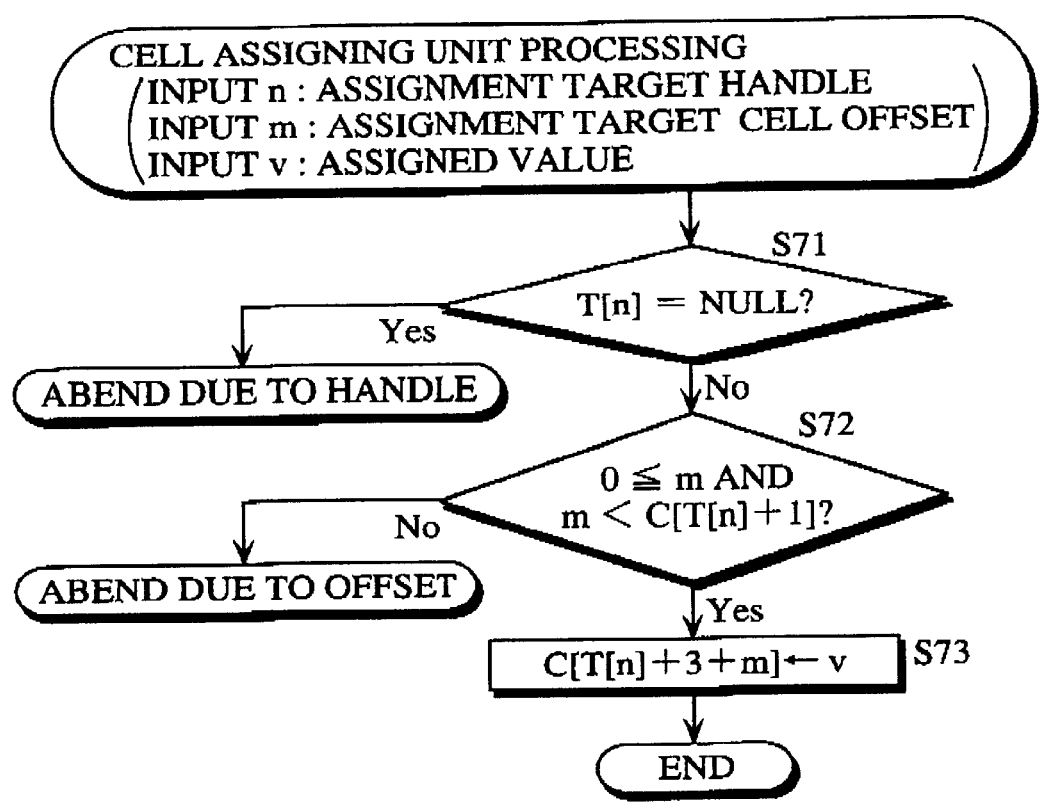
FIG. 17 is a flowchart showing the processing performed by a cell assigning unit 43 called by the terminals A1 to C3.

FIGS. 15 and 16 show a flowchart of the processing performed by each of the terminals A1 to C3, and FIG. 17 is a flowchart showing the processing performed by a cell assigning unit 43 called by the terminals A1 to C3.

A terminal s determines whether a new reservation request has been received from a user (S2401).

If a new reservation request has been received (S2401, Yes), the terminal s determines whether C[T[C[4]]+2+k] is a NULL value (S2407). If C[T[C[4]]+2+k] is a NULL value (S2407, Yes), the terminal s continues on to the processing of S2410. If C[T[C[4]]+2+k] is a not a NULL value, however (S2407, No), the terminal s cancels a provisional reservation held in a candidate cell block indicated by C[T[C[4]]+2+k] (S2408), assigns a NULL value to C[T[C[4]]+2+k] (S2409), and then continues on to the processing of S2410.

At S2410, the terminal s receives a user input specifying a number of seats and assigns the input value to x. Then, the terminal s calls the cell block allocation unit 441, inputting a required number of cells 2□x+1(S2411). Then, the processing shown in FIG. 11 is performed by the cell block allocation unit 441, reserving a cell block corresponding to a candidate cell block. Following this, the terminal s calls the cell assigning unit 43 twice, each time transmitting different input (S2412, S2413), and assigns values to cells corresponding to the system cell block and the candidate cell block.

Following this, the terminal s performs a search of a reservation database based on the number of reserved seats x, provisionally reserves two candidates, and assigns the two candidates to the candidate cell block indicated by a handle h (S2414). Then, the terminal s displays the two candidates (S2415), and ends processing.

If a new reservation request is not received at S2401, the terminal s determines whether one of the two candidates has been selected by the user (S2402). If a candidate has not been selected (S2402, No), the terminal s ends processing. If a candidate has been selected, however (S2402, Yes), the terminal s continues on to the processing of S2403.

At S2403, the terminal s assigns a selection number specifying one of the candidates to x, and the candidate, in the candidate cell block, that corresponds to the selection number x is confirmed as the actual reservation (S2404). Then, the terminal s assigns a NULL value to C[T[C[4]]+2+k], freeing cells in the system cell block indicating the candidate cell block for which a reservation has been confirmed (S2405).

Next, the terminal s displays a message indicating that confirmation of the reservation has been completed (S2406), and ends processing.

Before the cell assigning unit 43 is called in S2412 and S2413, it performs the following processing. First, the cell assigning unit 43 assigns a handle h indicating a start reference for a cell block to n, an offset value for a cell to which a value is to be assigned to m, and a value to be assigned to the cell to v. In FIG. 17, the cell assigning unit 43 first determines whether T[n] is a NULL value (S71) and whether m is at least 0 but less than C[T[n]+1] (S72). If T[n] is NULL (S71, Yes), the cell assigning unit 43 ends processing on the assumption that the handle is abnormal, and if m is not at least 0 but less than C[T[n]+1] (S72, No), ends processing on the assumption that the offset value is abnormal.

If T[n] is not NULL (S71, No), and m is at least 0 but less than C[T[n]+1] (S72, Yes), the cell assigning unit 43 assigns the value v to C[T[n]+3+m] (S73), and ends processing.

When, at S2411, the terminal s calls the cell block allocation unit 441 and a candidate cell block is reserved in the memory, the scavenging unit 442 and the compaction unit 443 in the garbage collector 44 of the present invention (see FIG. 8) perform scavenging and compaction as required, simultaneous with reservation of the system cell block.

Suppose that a number of cells is 50, a number of trays is 4 and user operations of terminals A1 to C3 take place as shown in Table 2. In this case, the processing performed by the reservation system shown in FIGS. 9 to 16 will create the changes to cells in the memory shown in FIGS. 18 to 23.

TABLE 2

| User Operation | |
| --- | --- |
| Operation I | Reservation for 9 seats from Terminal A |
| Operation II | Reservation for 4 seats from Terminal B |
| Operation III | Completion of Reservation for Terminal A |
| Operation IV | Reservation for 10 seats from Terminal C |

FIG. 18 shows the condition of cells immediately following the performance of operations I and II in table 2. FIG. 19 shows the condition of cells immediately prior to the processing performed by the scavenging unit 442 at S34 (see FIG. 12) when an operation IV is performed following an operation III. FIG. 20 shows the condition of cells immediately prior to processing performed by the scavenging unit 442 at S45, when the operation IV is performed. FIG. 21 shows the condition of cell immediately following processing performed by the scavenging unit 442 when the operation IV is performed. FIG. 22 shows the condition of cells immediately prior to processing performed by the compaction unit 443 at S61 (see FIG. 13), when the operation IV is performed. FIG. 23 shows the condition of cells immediately following processing performed by the compaction unit 443, when operation IV is performed.

In FIG. 18, the terminal A1 makes a reservation request for 9 seats using the operation I, and the terminal B2 makes a reservation request for 4 seats using the operation II. Immediately after these requests are made, cells 1 to 44 of the 50 cells in the memory managed by the garbage collector 44 are in use.

Next, once the terminal A1 selects a candidate, a reference 8 in the system cell block is changed to a NULL value in accordance with this. Then, if the terminal C3 makes a reservation request for 10 seats using the operation IV, the required number of cells 15 (=2□x+1=2□10+1) is more than 2 (=N−U−3 =50−45−3). Consequently, the garbage collector 44 determines that scavenging and compaction need to be performed (this corresponds to FIG. 11, S2201, No).

In the processing performed by the scavenging unit 442 until S34 (see FIG. 12), 'in use' flags for the root cell block, the system cell block, and the candidate cell blocks for the terminals A1 and B2 are initialized by being set at 0. Here, the NULL value that initializes cells is 0, so there is no change in the value of the 'in use' flags.

Here, the garbage collector 44 (see FIG. 8) cannot ascertain in advance whether a value held in a cell C[4] in the root cell block, values held in cells C[8] to C[10] in the system cell block, values held in cells C[14] to C[32] in the candidate cell block for the terminal A1, and values held in cells C[36] to C[44] in the candidate cell block for the terminal B2 are numerical values or handles. Consequently, in the processing of S41 and S42, the garbage collector 44 assumes cell values to be either numerical values or handles.

A value 1 held by the cell C[4] in the root cell block and a value 3 held by a cell B[9] in the system cell block are within the possible range for valid handles, and the values 5 and 33 held in the trays indicated by these handles are not NULL values (0). Therefore, the garbage collector 44 assumes that the cells C[4] and C[9] both hold handles, and furthermore that the system cell block and the candidate cell block for the terminal B2 indicated by the values that are held in the trays indicated by these handles are in use.

On the other hand, a value 0 held by a cell C[8] and a cell C[10] in the system cell block, and a value 9 held by a cell [14] in the candidate cell block for the terminal A1 are not within the possible range for valid handles. A value 4 held by a cell C[36] in the candidate block for the terminal B2 is within the possible for valid handles, but the tray indicated by this handle holds a value 0. Therefore, the garbage collector 44 assumes that the cells C[8], C[10], C[14], and C[36] hold numerical values. The garbage collector 44 makes similar assumptions about the cells C[15] to C[32] in the candidate block for the terminal A1 and about the cells C[37] to C[44] in the candidate block for the terminal B2.

As a result of these assumptions, the garbage collector 44 sets 'in use' flags for cell blocks assumed to be in use, in other words cells C[3], C[7], and C[35], at 1, as shown in FIG. 20. Following this, processing performed by the garbage collector 44 from S45 onward sets a NULL value in a tray T[2] that indicates a cell block that has been assumed to be unused, and the condition of the cells is as shown in FIG. 21.

The scavenging unit 442 makes inferences about the reference relationships between cell blocks according to whether a cell value is assumed to be a numerical value or a handle. Following this, the compaction unit 443 places the cells in the condition shown in FIG. 22 and then in that shown in FIG. 23, by reserving an area for storing seat numbers and numbers of seats for a number of seats 10 requested in an operation IV.

In this way, the reservation system is divided into components directly concerned with the operation of the application, that is seat reservation, and the garbage collector 44 that reserves and frees memory according to request from the application. Here, the garbage collector 44 operates independently of the other components. Since the garbage collector 44 performs scavenging while assuming whether cell contents are numerical values or handles, there is no need to reserve memory for reference flags and the like. Consequently, this prevents an excessive processing load being placed on the processor when the application is executed, as well as enabling high speed compaction to be performed.

The following is an explanation of a modification of the garbage collector 44. The garbage collector in this modification sets a 'use prohibited' flag for each tray, and allocates cell blocks with reference to these 'use prohibited' flags.

Figure 24:
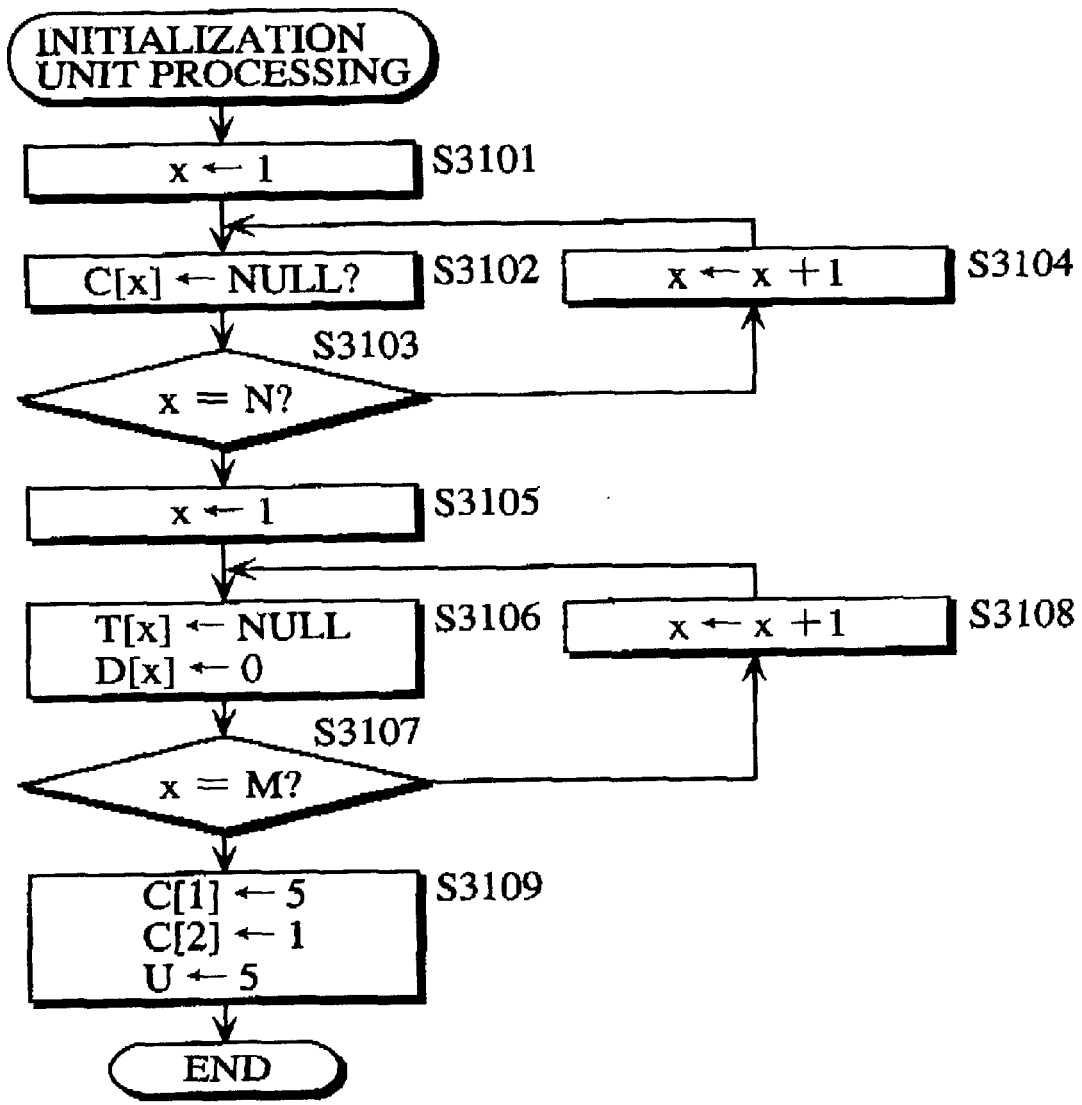
FIG. 24 is a flowchart showing processing performed by the initialization unit 41 prior to execution performed by the garbage collector of the modification.
Figure 25:
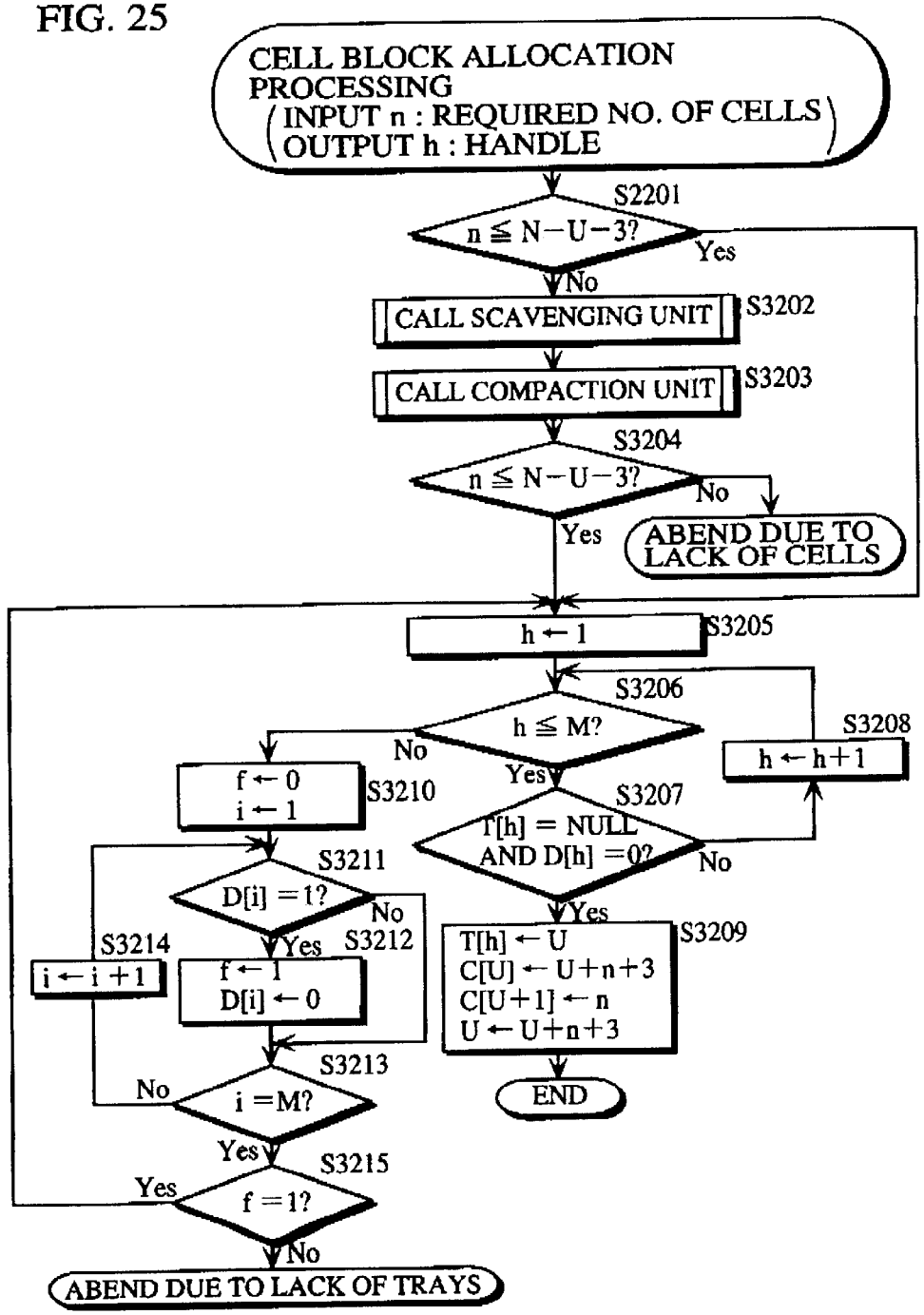
FIG. 25 is a flowchart showing processing performed by a cell block allocation unit in the garbage collector of the modification.
Figure 26:
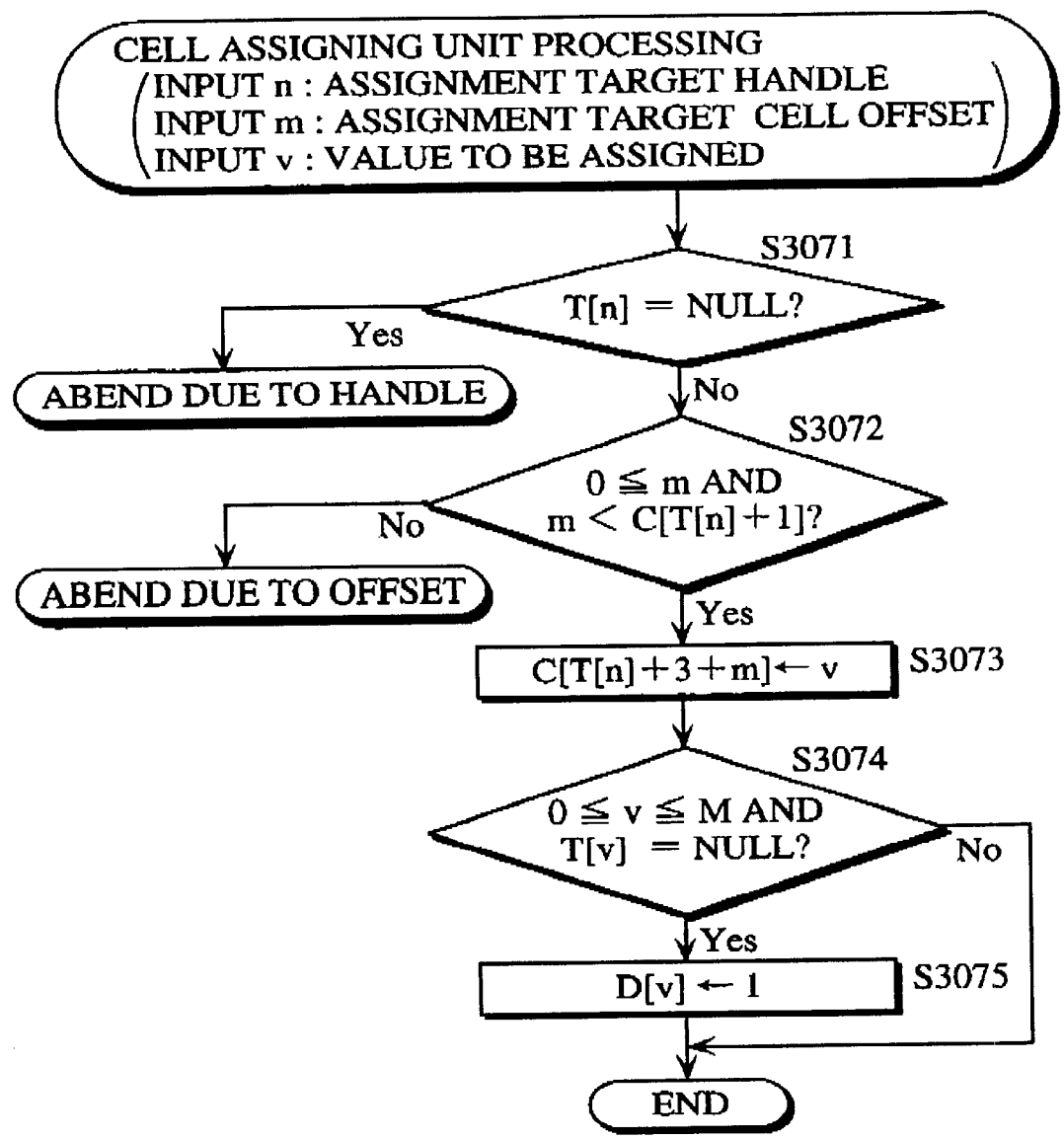
FIG. 26 is a flowchart showing processing performed by a cell assigning unit in the garbage collector of the modification.
Figure 28:
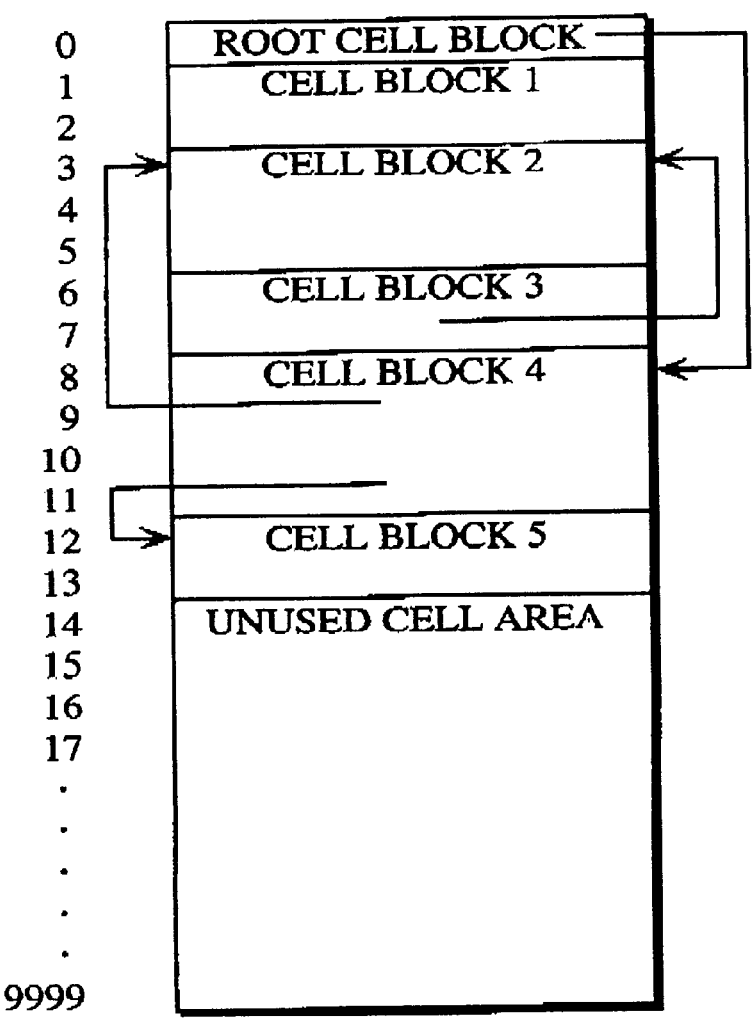
FIG. 28 shows an example of a cell block composed of a plurality of cells.
Figure 29:
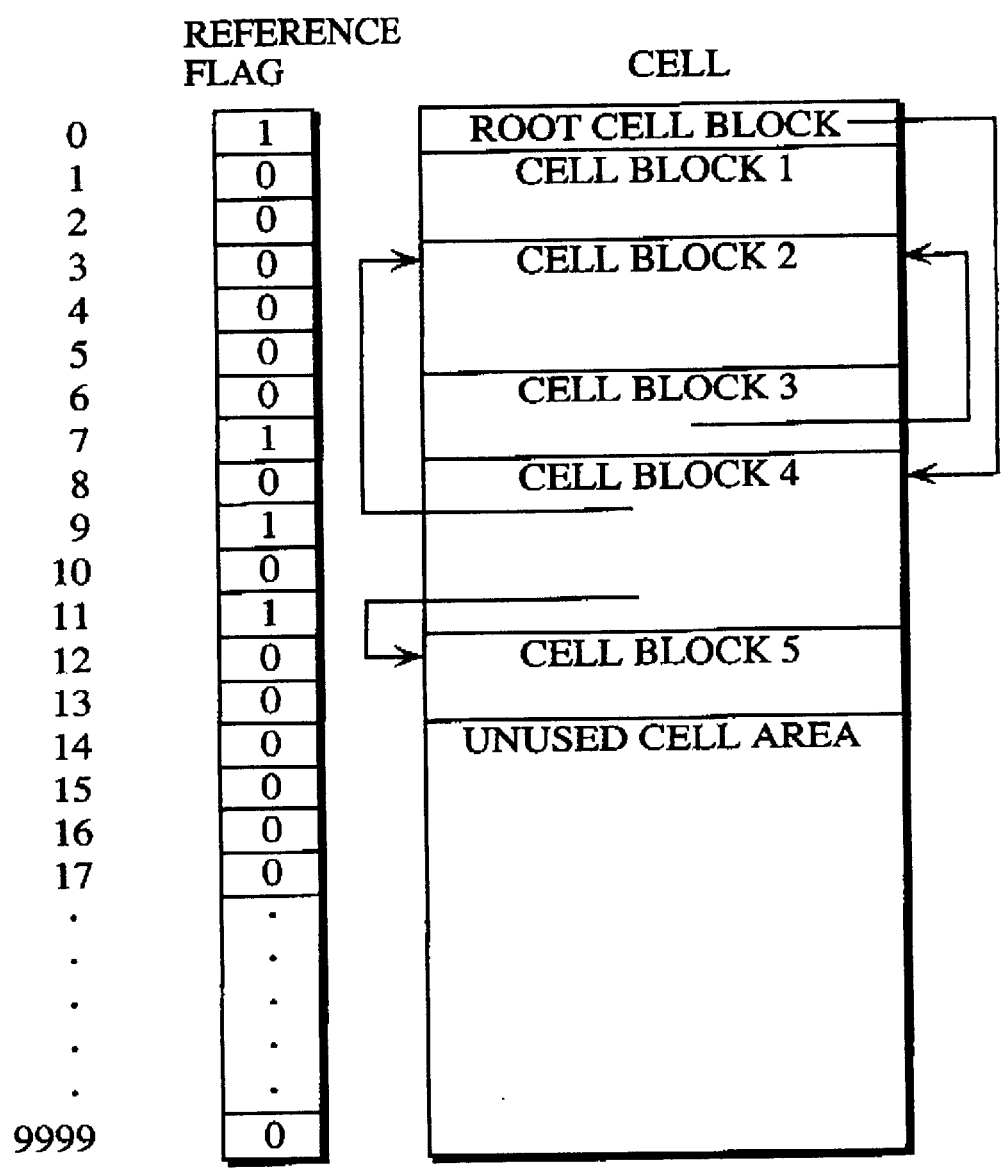
FIG. 29 shows an example of cell blocks, each formed from a plurality of cells, in a heap memory used by the garbage collector of a first prior art, and the reference relationships between the cell blocks.
Figure 30:
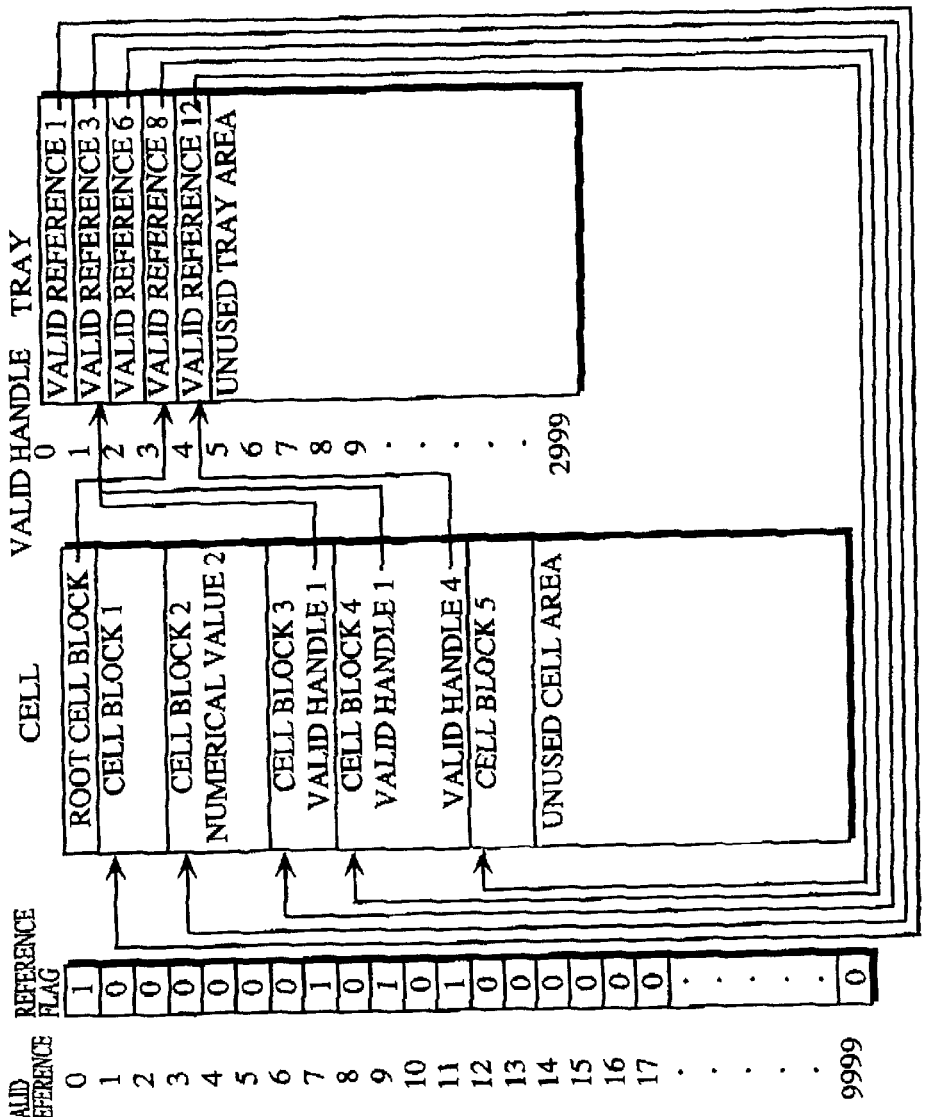
FIG. 30 shows an example of cell blocks, each formed from a plurality of cells, in a heap memory used by the garbage collector of a second prior art, and the reference relationships between the cell blocks.
Figure 31:
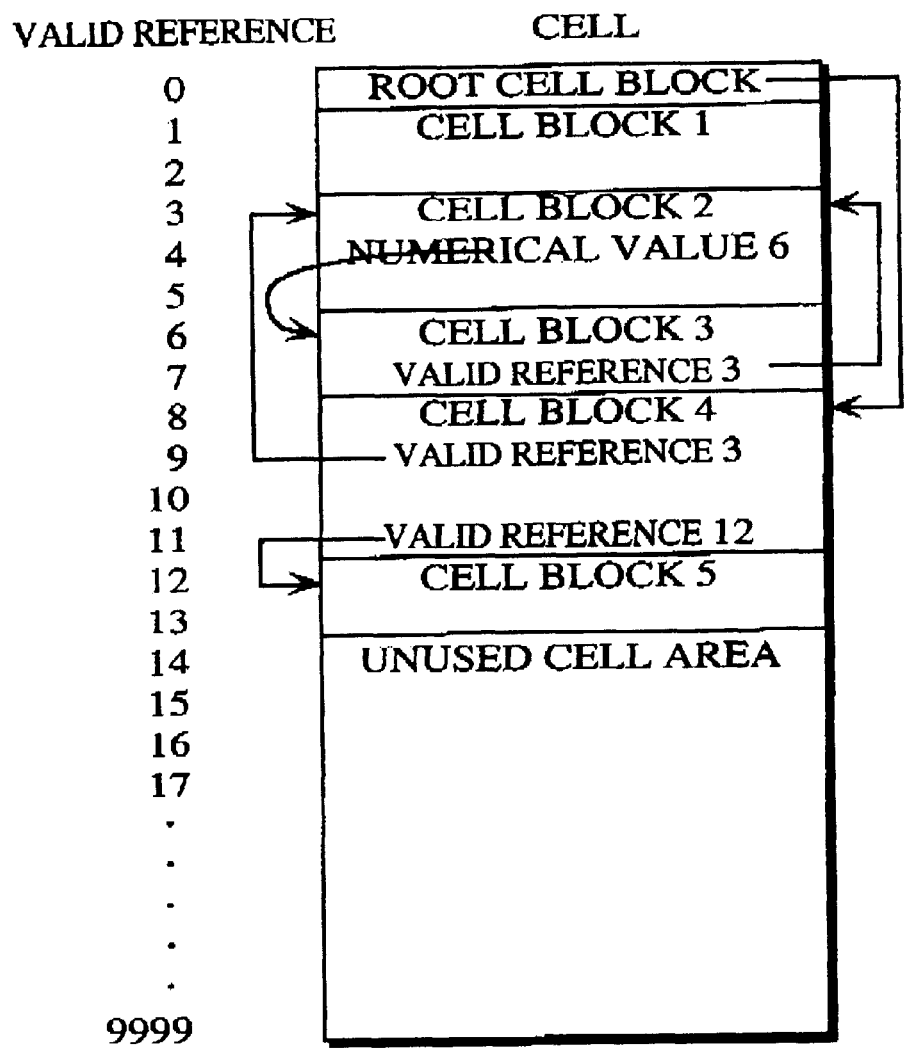
FIG. 31 shows an example of cell blocks, each formed from a plurality of cells, in a heap memory used by the garbage collector of a third prior art, and the reference relationships between the cell blocks.

FIG. 24 is a flowchart showing processing performed by the initialization unit 41 prior to execution performed by the garbage collector of the modification. FIG. 25 is a flowchart showing processing performed by a cell block allocation unit in the garbage collector of the modification. FIG. 26 is a flowchart showing processing performed by a cell assigning unit in the garbage collector of the modification.

The initialization unit 41 in the reservation system performs processing as shown in FIG. 24, S3106, initializing a tray T[x] by setting a NULL value, and a 'use prohibited' flag D[x] corresponding to the tray T[x] by setting a value of 0.

In processing performed by a cell assigning unit in the garbage collector of the modification, when a value assigned to cell to be used is within the possible range for valid handles, and the tray corresponding to the handle holds a NULL value, use of the tray is prohibited, so a value of 1 is assigned to the 'use prohibited' flag D[x] for this tray, as shown in S3074 and S3075 in FIG. 26.

Furthermore, the cell assigning unit, as shown in the processing of S3207 in FIG. 25, specifies a handle h for a newly allocated cell block to trays which hold a NULL value and have a 'use prohibited' flag D[x] set at 0.

If h is more than a number of trays M (S3206, No), the cell block allocation unit, as shown in the processing of S3210 to S3215, cancels the prohibition of the use of all trays with 'use prohibited' flags set at 0, and repeats the processing of S3205 onward.

First, the cell block allocation unit assigns a value 0 to a work flag f, and a value 1 to i (S3210), and determines whether a 'use prohibited' flag D[i] corresponding to a tray T[i] is 1 (S3211). If D[i] is 1 (S3211, Yes), the cell block allocation unit assigns a value 1 to f and a value 0 to D[i] (S3212). On the other hand, if D[i] is not 1 (S3211, No), the processing of S3212 is not performed.

Following this, the cell block allocation unit determines whether i is equal to a number of trays M (S3213). If i is not equal to M (S3213, No), the cell block allocation unit adds 1 to i, and repeats the processing of S3211 onward. If i is equal to M (S3213, Yes), the cell block allocation unit determines whether f is 1 (S3215).

If f is not 1 (S3215, No), the cell block allocation unit brings processing to an abnormal end due to there being insufficient trays. If f is 1 (S3215, Yes), the cell block allocation unit continues on to the processing of S3205. In subsequent processing, the cell block allocation unit specifies a handle h that corresponds to a newly allocated cell block for a tray that holds a NULL value, and also has a 'use prohibited' flag that has been changed to 0.

Here, even if a numerical value is mistakenly assumed to be a handle in subsequent scavenging processing, use of the tray corresponding to this value has been prohibited, and the cell block allocation unit has performed the above described processing. As a result, a handle h corresponding to a newly allocated cell block can only be specified for a tray that holds a NULL value and has a 'use prohibited' flag set at 0. This ensures that assumptions made regarding cell content by the scavenging unit can be made with greater veracity.

The scavenging unit assumes that a cell holds a handle when a value contained in the cell is within the available range for handles and, if the value is considered to be a handle, the tray specified by the handle does not hold a NULL value. When a numerical value assigned to a cell is within the available range for handles, but a tray specified, if this value is considered to be a handle, holds a NULL value, the tray concerned has a 'use prohibited' flag set at 1. This means that use of the tray is prohibited, and it continues to hold a NULL value. Consequently, cases in which a numerical value within the available range for handles is mistakenly assumed to be a handle can be avoided, and delays in freeing cells can also be avoided.

Furthermore, when no trays are available for use, prohibitions on tray use can be lifted by resetting the 'use prohibited' flags for the trays, thus preventing delays in freeing cells that are not in use, as well as enabling trays to be used more effectively.

What is claimed is:

1. A garbage collection apparatus that performs (1) scavenging processing for specifying unused cell blocks from among a plurality of cell blocks, some of which can be reached from a specified root cell block via one of a set of trays, tracing one or more cell blocks in a chain-like manner by referencing each of the one or more cell blocks, and others of which cannot be reached in this manner and are referred to as the unused cell blocks, each of the set of trays being specified by a second type address and holding a valid first type address, each of the plurality of cell blocks (a) being specified by a first type address and (b) including a plurality of cells that each hold one of a second type address and a numerical value, and (2) compaction processing for relocating each of the specified unused cell blocks so as to form a continuous memory area, and updating each first type address that is held in a tray and corresponds to a cell block so as to specify a cell block following relocation, the garbage collection apparatus comprising:

assuming means for making an assumption as to whether a second type address is stored in a cell included in a first cell block, so as to avoid a situation in which the second type address is mistakenly assumed not to be a second type address, wherein a value used for the second type address is limited to within a specific range, and the assuming means makes an assumption that data held by the cell is a second type address only when (i) the data is within the specific range, and (ii) a tray specified by the data, when hypothetically assumed to be a second type address, holds a valid first type address; and specifying means for specifying an unused cell block using the scavenging processing by assuming that a second cell block is referenced by the first cell block, the second cell block being specified by a first type address, the first type address being held in the tray specified by the data assumed to be the second type address.

2. The garbage collection apparatus of claim 1, wherein a tray indicating an unused cell block newly specified by the scavenging processing is recognized as an unused tray that does not hold a first type address.

3. The garbage collection apparatus of claim 1, further comprising:

detecting means for detecting that a value has been newly assigned to a cell; and prohibiting means for prohibiting, when the newly assigned value is assumed to be a second type address by the assuming means, use of a tray specified by the numerical value by hypothetically assuming that the value is a second type address.

4. The garbage collection apparatus of claim 3, further comprising:

freeing means for freeing, when (1) a specified number of trays that each (a) hold a first type address or (b) are prohibited from being used, cannot be used, and (2) a request for use of a new tray is received, the trays that are prohibited from being used.

5. A garbage collection method that performs (1) scavenging processing for specifying unused cell blocks from among a plurality of cell blocks, some of which can be reached from a specified root cell block via one of a set of trays, tracing one or more cell blocks in a chain-like manner by referencing each of the one or more cell blocks, and others of which cannot be reached in this manner and are referred to as the unused cell blocks, each of the set of trays being specified by a second type address and holding a valid first type address, each of the plurality of cell blocks (a) being specified by a first type address and (b) including a plurality of cells that each hold one of a second type address and a numerical value, and (2) compaction processing for relocating each of the specified unused cell blocks so as to form a continuous memory area, and updating each first type address that is held in a tray and corresponds to a cell block so as to specify a cell block following relocation, the garbage collection method comprising:

an assuming step for making an assumption as to whether a second type address is stored in a cell included in a first cell block, so as to avoid a situation in which the second type address is mistakenly assumed not to be a second type address, wherein a value used for the second type address is limited to within a specific range, and the assuming means makes an assumption that data held by the cell is a second type address only when (i) the data is within the specific range, and (ii) a tray specified by the data, when hypothetically assumed to be a second type address, holds a valid first type address; and a specifying step for specifying an unused cell block using the scavenging processing by assuming that a second cell block is referenced by the first cell block, the second cell block being specified by a first type address, the first type address being held in the tray specified by the data assumed to be the second type address.

6. A record medium recording a computer-readable program that allows a computer to perform (1) scavenging processing for specifying unused cell blocks from among a plurality of cell blocks, some of which can be reached from a specified root cell block via one of a set of trays, tracing one or more cell blocks in a chain-like manner by referencing each of the one or more cell blocks, and others of which cannot be reached in this manner and are referred to as the unused cell blocks, each of the set of trays being specified by a second type address and holding a valid first type address, each of the plurality of cell blocks (a) being specified by a first type address and (b) including a plurality of cells that each hold one of a second type address and a numerical value, and (2) compaction processing for relocating each of the specified unused cell blocks so as to form a continuous memory area, and updating each first type address that is held in a tray and corresponds to a cell block so as to specify a cell block following relocation, the program allowing the computer to execute:

an assuming step for making an assumption as to whether a second type address is stored in a cell included in a first cell block, so as to avoid a situation in which the second type address is mistakenly assumed not to be a second type address, wherein a value used for the second type address is limited to within a specific range, and the assuming means makes an assumption that data held by the cell is a second type address only when (i) the data is within the specific range, and (ii) a tray specified by the data, when hypothetically assumed to be a second type address, holds a valid first type address; and a specifying step for specifying an unused cell block using the scavenging processing by assuming that a second cell block is referenced by the first cell block, the second cell block being specified by a first type address, the first type address being held in the tray specified by the data assumed to be the second type address.

7. A program that allows a computer to perform (1) scavenging processing for specifying unused cell blocks from among a plurality of cell blocks, some of which can be reached from a specified root cell block via one of a set of trays, tracing one or more cell blocks in a chain-like manner by referencing each of the one or more cell blocks, and others of which cannot be reached in this manner and are referred to as the unused cell blocks, each of the set of trays being specified by a second type address and holding a valid first type address, each of the plurality of cell blocks (a) being specified by a first type address and (b) including a plurality of cells that each hold one of a second type address and a numerical value, and (2) compaction processing for relocating each of the specified unused cell blocks so as to form a continuous memory area, and updating each first type address that is held in a tray and corresponds to a cell block so as to specify a cell block following relocation, the program comprising:

an assuming step for making an assumption as to whether a second type address is stored in a cell included in a first cell block, so as to avoid a situation in which the second type address is mistakenly assumed not to be a second type address, wherein a value used for the second type address is limited to within a specific range, and the assuming means makes an assumption that data held by the cell is a second type address only when (i) the data is within the specific range, and (ii) a tray specified by the data, when hypothetically assumed to be a second type address, holds a valid first type address; and a specifying step for specifying an unused cell block using the scavenging processing by assuming that a second cell block is referenced by the first cell block, the second cell block being specified by a first type address, the first type address being held in the tray specified by the data assumed to be the second type address.

8. A garbage collection apparatus for specifying and relocating unused cell blocks in a memory having a plurality of cells forming a cell array, each cell block being composed of a plurality of cells in the cell array and having a start cell, a length cell, an in-use flag cell, and one or more content cells, each cell in the cell array being specified by a first type address that is a reference and holding one of a numerical value, a valid handle specifying a second type address for a tray that stores a valid reference, and a null handle not specifying a second type address for a tray, each tray of a plurality of trays forming a tray array being identified by a handle and holding one of a valid reference indicating a cell address and a null reference not indicating a cell address, the garbage collection apparatus comprising:

a scavenging unit for specifying an unused cell block in the cell array, the scavenging unit for determining whether the contents of a first cell within a first cell block holds a second type address as a valid handle specifying a first tray in a tray array, the scavenging unit for determining whether the first tray holds a first type address as a valid reference specifying the start cell of a second cell block, the scavenging unit deeming the contents of the first cell as a valid handle when the specified first tray holds a valid reference and deeming the contents of the first cell as a null handle when the first tray holds a null reference, the scavenging unit deeming the second cell block specified by the first tray as an unused cell block when the second cell block in-use flag cell indicates the second cell block is not in use; and a compacting unit for relocating each specified unused cell block so as to form a continuous memory area.

9. The garbage collection apparatus of claim 8, wherein the cell array includes a root cell block having a first valid handle and all used cell blocks are traced beginning with the first valid handle to the first valid tray to a first valid cell block, each subsequent cell block being traced by a valid handle to a tray holding a valid reference.

10. The garbage collection apparatus of claim 8, wherein the cell array and tray array reside in different memories.

11. The garbage collection apparatus of claim 8, wherein the cell array and tray array in the same memory with the cell array being located within a first address range and the tray array being located within a second address range.

12. The garbage collection apparatus of claim 8, wherein the scavenging unit deems the first tray contents as a null reference when the second cell block in-use flag indicates the second cell block is not in use.

13. The garbage collection apparatus of claim 12, wherein the scavenging unit deems the first cell contents as a null handle when the first tray contents indicates a null reference.

14. A memory management apparatus for allocating new cell blocks and relocating unused cell blocks in a memory having a plurality of cells forming a cell array, each cell block being composed of a plurality of cells in the cell array and having a start cell, a length cell, an in-use flag cell, and one or more content cells, each cell in the cell array being specified by a first type address that is a reference and holding one of a numerical value, a valid handle specifying a second type address for a tray that stores a valid reference, and a null handle not specifying a second type address for a tray, each tray of a plurality of trays forming a tray array being identified by a handle and holding one of a valid reference indicating a cell address and a null reference not indicating a cell address, the garbage collection apparatus comprising:

a scavenging unit for specifying an unused cell block in the cell array, the scavenging unit for determining whether the contents of a first cell within a first cell block holds a second type address as a valid handle specifying a first tray in a tray array, the scavenging unit for determining whether the first tray holds a first type address as a valid reference specifying the start cell of a second cell block, the scavenging unit deeming the contents of the first cell as a valid handle when the specified first tray holds a valid reference and deeming the contents of the first cell as a null handle when the first tray holds a null reference, the scavenging unit deeming the second cell block specified by the first tray as an unused cell block when the second cell block in-use flag cell indicates the second cell block is not in use;

a compacting unit for relocating each specified unused cell block so as to form a continuous memory area, wherein the cell array is arranged from a lower reference address to a higher reference address and any unused cell block at a lower reference address is relocated by transferring the contents of a each used cell block at a higher reference address to a new location in the cell array based on the length of the relocated unused cell block while maintaining the order of the used cell blocks from the lower reference address to the higher reference address, and wherein each tray holding a valid reference is updated corresponding to the new location of each used cell block; and a cell block allocation unit for allocating a new cell block of a predetermined length in the cell array based on a request from an application unit, the cell block allocation unit initiating the scavenging unit to specify unused cell blocks and the compaction unit to relocate unused cell blocks when the continuous area of memory available in the cell array is insufficient to accommodate the allocation of the requested new cell block of the predetermined length.

15. The memory management apparatus of claim 14, wherein each tray includes a use prohibited flag to prohibit using a specified tray to hold a valid handle when a content cell of a predetermined cell block holds a valid handle specifying a tray with a null reference.

16. A memory management apparatus for allocating new cell blocks and relocating unused cell blocks in a memory having a plurality of cells forming a cell array, each cell block being composed of a plurality of cells in the cell array and having a start cell, a length cell, an in-use flag cell, and one or more content cells, each cell in the cell array being specified by a first type address that is a reference and holding one of a numerical value, a valid handle specifying a second type address for a tray that stores a valid reference, and a null handle not specifying a second type address for a tray, each tray of a plurality of trays forming a tray array being identified by a handle and holding one of a valid reference indicating a cell address and a null reference not indicating a cell address, the garbage collection apparatus comprising:

a scavenging unit for specifying an unused cell block in the cell array, the scavenging unit for determining whether the contents of a first cell within a first cell block holds a second type address as a valid handle specifying a first tray in a tray array, the scavenging unit for determining whether the first tray holds a first type address as a valid reference specifying the start cell of a second cell block, the scavenging unit deeming the contents of the first cell as a valid handle when the specified first tray holds a valid reference and deeming the contents of the first cell as a null handle when the first tray holds a null reference, the scavenging unit deeming the second cell block specified by the first tray as an unused cell block when the second cell block in-use flag cell indicates the second cell block is not in use, wherein the cell array includes a root cell block having a first valid handle and all used cell blocks are traced beginning with the first valid handle to the first valid tray to a first valid cell block, each subsequent cell block being traced by a valid handle to a tray holding a valid reference, the scavenging unit deeming any cell block not traceable from the root cell block as an unused cell block;

a compacting unit for relocating each specified unused cell block so as to form a continuous memory area, wherein the cell array is arranged from a lower reference address to a higher reference address and any unused cell block at a lower reference address is relocated by transferring the contents of a each used cell block at a higher reference address to a new location in the cell array based on the length of the relocated unused cell block while maintaining the order of the used cell blocks from the lower reference address to the higher reference address, and wherein each tray holding a valid reference is updated corresponding to the new location of each used cell block; and a cell block allocation unit for allocating a new cell block of a predetermined length in the cell array based on a request from an application unit, the cell block allocation unit initiating the scavenging unit to specify unused cell blocks and the compaction unit to relocate unused cell blocks when the continuous area of memory available in the cell array is insufficient to accommodate the allocation of the requested new cell block of the predetermined length.

17. The memory management apparatus of claim 16, wherein a valid handle held by a predetermined cell block cannot specify a tray hold a valid reference to the same predetermined cell block.

18. A memory cell block allocation and garbage collection method for an interdependent data structure of cell blocks residing on a plurality of memory cells in a cell array, comprising:

receiving a new cell block request including a predetermined cell block length;

comparing the continuous memory length available in the cell array to the requested new cell block length and producing a request result;

allocating the new cell block of the predetermined cell block length if the request result indicates that a sufficient continuous memory length is available in the cell array; and invoking a garbage collecting process if the request result indicates that a sufficient continuous memory length is not available in the cell array, wherein the garbage collecting process is determined by examining the interdependencies of the cell blocks independent from a separate memory flag indicating the used or unused status of each cell block.

19. The method of claim 18, wherein the garbage collecting process comprises:

tracing the cell array from a root cell block to identify unused memory space, the root cell block being the starting point for the data structure, all used cell blocks being traceable from the root cell block while all unused cell blocks being untraceable from the root cell block;

specifying any unused cell blocks;

relocating the specified unused cell blocks to form a continuous area of unused cells in the cell array.

* * * * *